United States Patent [19]

Spencer

[11] 3,830,964

[45] Aug. 20, 1974

[54] APPARATUS AND METHOD FOR TRANSMITTING A BANDWIDTH COMPRESSED DIGITAL SIGNAL REPRESENTATION OF A VISIBLE IMAGE

[75] Inventor: David R. Spencer, Lexington, Mass.

[73] Assignee: EG & G, Inc., Bedford, Mass.

[22] Filed: Jan. 3, 1973

[21] Appl. No.: 320,808

[52] U.S. Cl. .......... 178/6, 178/DIG. 3

[51] Int. Cl. .......... H04n 7/12

[58] Field of Search .......... 178/DIG. 3, 6

[56] References Cited

UNITED STATES PATENTS

| | | | |
|---|---|---|---|
| 2,909,601 | 10/1959 | Fleckenstein et al. | 178/6.8 |
| 3,215,773 | 11/1965 | Chatten et al. | 178/6.8 |

*Primary Examiner*—Howard W. Britton
*Assistant Examiner*—Edward L. Coles
*Attorney, Agent, or Firm*—Ralph L. Cadwallader; Leo M. Kelly; John A. Lahive, Jr.

[57] ABSTRACT

A method and system for producing and transmitting to a remote location a compressed digital signal representation of an image, and receiving at a remote location and expanding that representation to construct a facsimile image. The image to be transmitted is scanned in accordance with a pattern of uniformly spaced lines of scan to produce a digital signal representative of the optical density along the lines of scan. A full scan line signal is encoded in a predetermined pattern in a preselected one of two modes. In the first mode, each scan line signal is represented by a sequence of binary number pairs, each pair corresponding to a contiguous portion of that scan line signal, while in the second encoding mode, corresponding portions of successive scan line signals are compared and a digital signal produced to represent the difference between the successive scan line signals. Reference marker signals are also encoded with the scan line signals to limit error propagation. The encoded scan line signals are further encoded for transmission in a variable length code word format. The encoded scan signals are transmitted to a remote receiver where those signals are decoded and used to generate a facsimile at the remote location.

4 Claims, 16 Drawing Figures

APPARATUS AND METHOD FOR TRANSMITTING A BANDWIDTH COMPRESSED DIGITAL SIGNAL REPRESENTATION OF A VISIBLE IMAGE

BACKGROUND OF THE INVENTION

This invention relates to image transmission systems, and more particularly to methods and systems for transmissions of a compressed digital signal representation of an image.

It is well known in the art to use digital signal processing techniques to produce a digital representation of a graphic image and to store, transmit and reproduce that image at remote locations, for example, as in television and telemetering systems. In addition it is known in the art to provide facsimile transmission systems in which the image to be transmitted is scanned by an optical detector along closely spaced parallel lines while an optical detector samples the optical density of the image at discrete locations along each line and produces a binary code word representative of the sample density of each location. This sequence of sample code words may be stored, transmitted and finally used to produce a facsimile image at a remote location. Such digital representations of the image to be transmitted include a substantial amount of redundant information due to the inherent redundancies in the image itself. The redundant information may be eliminated by digital coding techniques which are based on foreknowledge of general characteristics of the class of images to be transmitted, and thereby the bandwidth of the digital facsimile signal may be reduced. Such techniques are said to accomplish bandwidth compression of the data. The following shows a simplified example of the possible bandwidth compression for a facsimile transmission system. In this example, the surface of a blank sheet of white paper may serve as an image to be transmitted. In a facsimile transmission system having no bandwidth compression capability, this surface may be subdivided into 100 regions, for each of which a single bit signal may be generated, to indicate that each of the subdivided regions is "white." The resultant 100 bit signal fully describes the surface of the paper and may be transmitted to a remote location where a facsimile image may be reconstructed. Alternatively in a bandwidth compression facsimile transmission system, a code word having significantly fewer than 100 bits may be assigned to be equivalent to an "all white image." This code word, when transmitted to a remote location, may also be used to generate a facsimile of the original image. In the case where the assigned code word includes two bits, for example, then as much as a 50 to one reduction in transmission channel bandwidth may be achieved by the latter system compared with the system having no bandwidth compression.

The prior art facsimile transmission systems generally encode the scan line signals of the above described type to eliminate much of the redundant information in the signal and to provide a measure of data bandwidth compression in order to lessen transmission channel bandwidth limitations, and also digital storage requirements. For example, a "run-length coding" technique has been used to encode successive sequences in a scan line signal. To use this technique, the densities of the sample portions of the image in a full scan line are first converted to one of two values, corresponding to a binary 0 and 1. The scan line data is then treated as a series of segments comprising "runs" of consecutive 0's alternated with "runs" of consecutive 1's. Adjacent segments of the line are encoded with a binary number pair, the first number corresponding to the number of samples in the 0 run, and the second number corresponding to the number of the 1 run. The resultant encoded signal comprising the binary number pairs (corresponding to the "run-lengths") provides a bandwidth compressed scan line signal. However, a system utilizing this run-length coding technique still faces substantial transmission channel bandwidth constraints, placing severe limits on the system transmission rate and resolution.

The inadequacies of such earlier systems may be illustrated by the following example in which it is desired to transmit a facsimile of an original copy 18 inches wide and 27 inches long (486 square inches) within a fifteen minute period (900 seconds), having a resolution of 0.01 inches in both the vertical and horizontal dimensions. Thus, the scanner must provide 10,000 samples per square inch. In this example, the optical scan detector must traverse the original image at a rate equal to 0.03 inches per second, and further since the system resolution requires scan line spacing of 0.01 inches, three lines must be scanned per second. Therefore, to achieve the desired system resolution, the scan detector must provide 10,000 samples per square inch and must scan at a rate of 0.54 square inches per second and thereby generate 5400 samples per second. If each sample of image density is represented either as a binary zero or one respectively representing "white" and "black") the transmission bit rate must equal 5400 Hz. To store a digital representation of the image in uncoded binary form, a memory having capacity of 4.86 million bits is required.

The transmission bit rate for this exemplary system imposes a severe limitation on the bandwidth of the communication channel. For example, general purpose voice band data transmission channels are designed for signals having a bandwidth of 600 to 3000 Hz (AT&T Co., schedule 4B, and Western Union Telegraph Co., schedule F.) These channels provide a bandwidth of 2400 Hz and are capable of transmitting 4800 bits per second using digital transmission techniques. Thus for the assumed resolution and time of transmission requirement in the above example, the generally available transmission channels are inadequate for the exemplary system.

SUMMARY OF THE INVENTION

Accordingly, it is one of the objects of this invention to provide a new and improved method and system for the generation at a remote location of a facsimile image.

Another object is to provide a method and system for the transmission of a bandwidth compressed digital signal representation of an image.

In the present invention, a digitally coded signal representation of the optical density of an image on a two dimensional surface, hereinafter referred to as subject copy, is generated and transmitted to a remote receiver, where that signal is decoded and a facsimile image is produced having substantially the same optical density as the subject copy. The subject copy may be, for example, a weather map printed on a sheet of paper.

The optical density of the subject copy is detected by any means well known in the art which effectively subdivides the subject copy into a rectangular matrix array of regions or cells, and scans and detects in sequence adjacent cells in a first row and repetitively scans and detects in sequence cells in each additional row. In this manner, each cell in the subject copy is represented in each scan data signal by a binary 1 or 0 (corresponding to black or white) in accordance with the detected optical density of that cell. The resultant digital representations of the subject copy is stored in a suitable memory means for subsequent encoding on a row by row basis. In general, the subject copy may comprise a graphic image which, when scanned in parallel lines as described above, provides optical density signals which are substantially similar from line to line, i.e., the locations and lengths of black and white segments in a given line are highly likely to be substantially the same as those in an adjacent line, indicating a large measure of redundant information being contained in two adjacent lines. The present invention provides an encoded scan data signal for pairs of adjacent scan line data signals in such a manner as to maintain a substantial reduction in the amount of redundant information in the resultant encoded signal as compared with systems using run-length coding bandwidth compression techniques. As a result, a system in accordance with the present invention provides a digital signal representation of the subject copy having substantially fewer information bits than the uncoded version provided by the scanning device, and also substantially fewer bits than versions provided by devices in the prior art. Thereby, this invention allows faster transmissions before a subject copy over a given bandwidth transmission channel. The resultant bandwidth limitations on the required transmission channel based on the system image transmission rate and resolution are correspondingly reduced.

To achieve this bandwidth compression, the present invention employs two source encoding modes. In a first encoding mode, absolute run length (ARL), run length coding is subdivided into segments each comprising a "run" of consecutive white cells followed by a run of consecutive black cells. Each such segment in this line is subsequently represented by a binary number pair, the first number of which corresponds to the number of cells in the black run, and the second to the number of white cells.

In a second encoding mode, (correlation CORREL), a high measure of data compression is achieved by using an efficient encoding technique to reduce the redundancy present in successive lines of scan data. This technique has been described in pending U.S. application Ser. No. 5,642, filed Jan. 26, 1970 and assigned to the assignee of all of the interest in the present invention. In this mode, the binary representation of a current line of scan data, is encoded by the successive comparison of the scan data for corresponding cells in the adjacent current and immediately preceding scan line and subsequent generation of digital signals representing the difference between the successive current and preceding scan line data. The comparison results in a subdivision of the scan data into a sequence of coded segments having one of three formats. In a first format, DELTA, a white run and following black run appears in both the current and preceding scan line such that the black run in said line overlaps one or more corresponding cell positions. In the DELTA format, an encoded segment includes a pair of binary numbers: the first, DELTA-I, corresponding to the signed algebraic number of cells which the first cell of the black run in the current line leads (plus) or lags (minus) the first cell of the black run in the preceding line; the second, DELTA-II, corresponding to the algebraic difference in the number of cells which comprise the black run in the current line and the number of cells which comprise the black run in the preceding line. In a second format, MERGE, a white run followed by a black run appears in the preceding scan line while the corresponding cells of the current line comprise only white cells. In the MERGE format, an encoded segment is represented by a single binary word, thereby indicating that there is no black run in the current line segment corresponding to the black run in the previous line. In a third format, NEW START, a white run followed by a black run appears and terminates in the current scan line while the corresponding cells of the preceding scan line comprise only white cells. In the NEW START format, the white and black run segment in the current scan line is treated as described above for the ARL encoding mode, i.e., a pair of binary numbers is generated, the first corresponding to the number of cells in the white run, and the second to the number of cells in the black run. In the CORREL encoding mode, therefore, each encoded line may be represented as a sequence of numbers which relate segments of the current scan line to the corresponding segments of the preceding line.

In order to increase the immunity to errors produced by detection or other processing, the particular encoding mode, ARL or CORREL, for the various ones of the plurality of lines in a subject copy is alternated on a cyclic basis, for example, one line ARL followed by 19 lines CORREL, one line ARL, 19 lines CORREL, etc. In this manner, a new reference line of ARL encoded segments is provided every twenty lines. Thereby an error which occurs during a line encoded in the reference ARL mode or the CORREL mode, is prevented from propagating through more than 19 subsequent lines. Other cycles may be used to provide either greater or lesser error propagation limits, as desired.

In addition to encoding as described above based on curent line (ARL mode) or current and previous lines (CORREL mode), grid marker signals are also used to terminate segments within the encoded lines. Such grid markers are encoded and transmitted together with the scan data to provide reference points within a line, for example, at the one-third and two-thirds points of a line, which are used by the system receiver to prevent a detection or processing error in a segment from propagating through an entire line of scan data.

Following the line encoding, the present invention further provides channel encoding, with variable word length coding for the above described source encoded scan line data. The particular code words assigned for various encoded line segments are based on a foreknowledge of the statistics of the encoded representation of the subject copy. For example, in the described embodiment, it is known that the scan data for the subject copy is substantially similar from line to line. In such a case, the DELTA encoding format of the CORREL mode is likely to produce many segments having number pairs 0,0, corresponding to black runs occurring in successive lines with identical starting cell positions and identical duration. The resultant channel encoding for such subject copy assigns the shortest code words in the code vocabulary for the often expected 0,0, pair. Similarly, for such subject copy, large displacements in position of black runs from line to line are not expected, for example, a 15,0 encoded pair corresponding to identical duration black runs in which the current scan line runs starts 15 cells prior to the preceding scan line run. For such a pair, longer channel code words in the code vocabulary are assigned.

The assignment of Huffman variable length code words (Huffman, "A Method for Construction of Minimum Redundancy Codes," Proc. IRE, Sept. 1952) to achieve the channel encoding would provide optimum efficiency data compression. However, receiver resynchronization with such encoded data is not assured in a finite time period following loss of synchronization at the receiver. To overcome this deficiency, the present embodiment of the invention utilizes a Scholtz variable length code (Scholtz, "Codes with Synchronization Capabilities," IEEE Trans of Information Theory, Vol. IT-12 No. 2 pp 35–142, April 1966) to provide both highly efficient, although not optimum, data compression and also automatic receiver resynchronization following loss. The hereindescribed embodiment uses a 21 word variable length Scholtz code in which the code word assignments are based on the probabilities of occurrence of the various ARL and CORREL encoded segments and control signals for a weather map facsimile transmission system.

In accordance with the present invention, relatively low rate scan signals are converted to high rate data signals in order that the above described encoding operations be performed in an on-line mode, i.e., continuously as received. To prevent gaps in encoded data during periods in the transmission of an image having a high degree of redundancy, a coded fill data sequence is added to the encoded data so that data is provided for transmission on a continuous, gap-free basis. The encoded data is thus provided at a uniform rate for suitable modulation and transmission over any known transmission medium.

Upon receipt at a remote location, the signal is demodulated by any means known in the art. The demodulated data is then decoded, deleting any fill data, in the reverse order of encoding using substantially the reverse operations as those for encoding. Thereupon the decoded scan line data is applied to a suitable printer known in the art to provide a facsimile of the subject copy.

BRIEF DESCRIPTION OF THE DRAWINGS

The foregoing and other objects of this invention, the various features thereof, as well as the invention itself may be more fully understood from the following description when read together with the accompanying drawings in which.

DESCRIPTION OF THE PREFERRED EMBODIMENT

Figure 1:
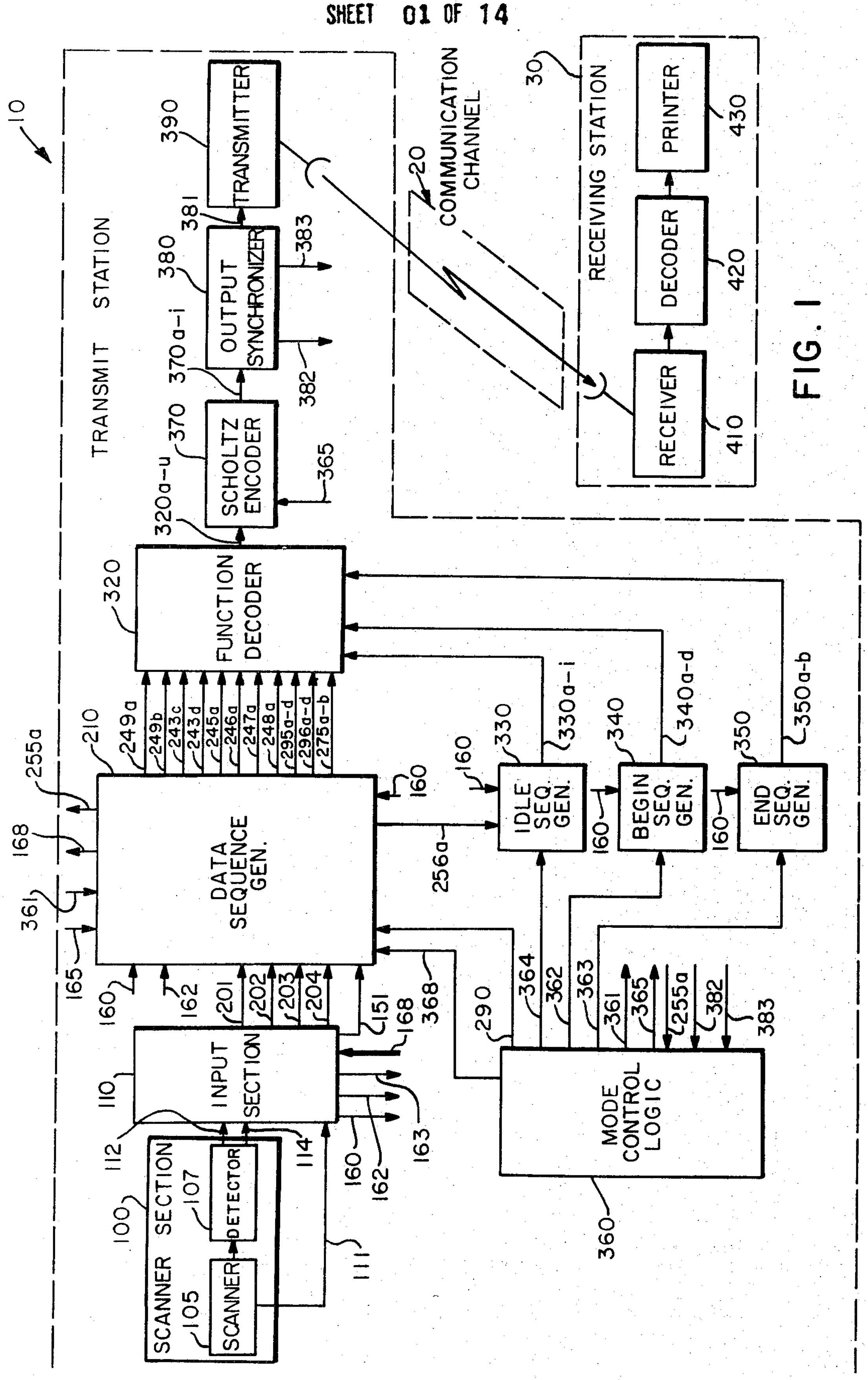
FIG. 1 illustrates in block diagram form the facsimile transmission system in accordance with the invention.

A communications systems embodying the present invention is shown in FIG. 1 to include a transmitting station 10, a communication channel 20 and a receiving station 30. In transmitting section 10, a digitally coded signal representation of the subject copy is produced in scanner section 100. The resultant digital signal is stored in input section 110 and subsequently source encoded by data sequence generator 210 under the control of mode control logic 360. Under the further control of logic 360, the source encoded data from generator 210 is processed with control data sequences produced by generators 330, 340 and 350, at which time function decoder 320 together with Scholtz encoder 370 is effective to channel encode the scanner data, combined with the control data signals from the aforementioned generators, to provide a highly efficient encoded version of the scan data. This channel encoded version is further processed by output synchronizer 380 and modulated and transmitted via transmitter 390 over the communication channel 20. The transmitted signal is received and demodulated by receiving station 30 in receiver 410 after which it is decoded by decoder 420. The decoded signal is subsequently printed by printer 430, thereby producing a facsimile image having substantially the same optical density as the subject copy.

SCANNER SECTION

Scanner section 100 (FIG. 1) is effective to provide a digital signal representative of the optical density of the subject copy. The scanner device 105 may be one of several types of optical scanners known in the art in which the subject copy is effectively subdivided into a rectangular matrix array of regions or cells, in which matrix the rows are scanned in sequence and in which the cells within each row are scanned in sequence. In the hereindescribed embodiment, scanner 105 may be effective for example, to provide 0.01 × 0.01 square inch resolution by subdividing a scan line of an 18 inch wide subject copy into 1800 cells and spacing scan lines so that there are 100 scan lines per inch. Scanner 105 further provides that optical detector 107 generates two digital signals per scan cell via lines 112 and 114 respectively representing a first and second adjacent regions or "half-cells" within each scan cell. The detector 107 signals may be binary 0 for any such portion of a scan cell in which the detected optical density is below a predetermined threshold value, and binary 1 corresponding to any such portion in which the density exceeds said threshold. In this manner, scan section 100 is effective to generate two binary digital data signals each being representative of the detected optical density of a succession of alternately spaced half-cell regions in each line of the subject copy.

Figure 2:
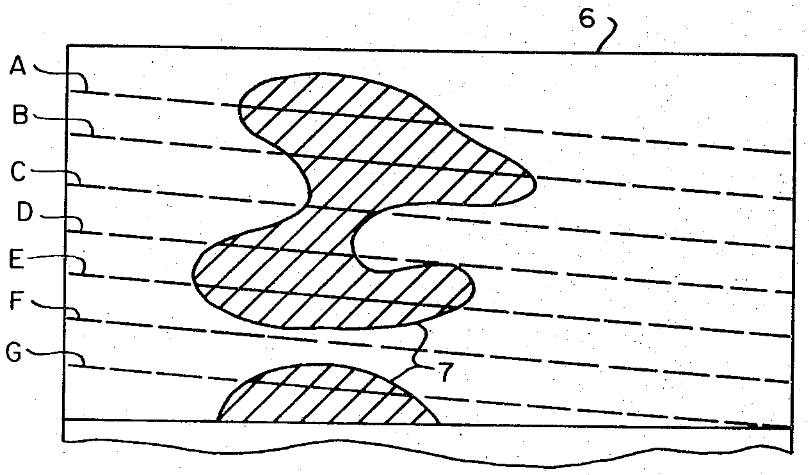
FIG. 2 is a diagrammatic representation of an exemplary graphic image to be transmitted by the system in FIG. 1.

An example of a graphic image which may be a subject copy is shown in FIG. 2. In that figure, sheet of paper 6 includes two black (shaded) regions 7 on a white (unshaded) background. In the present embodiment, scanner 105 is effective to scan paper 6 along the indicated transverse lines A–G. Optical detector 107 is effective to produce scan data signals corresponding to a binary 0 for scan cells overlapping the broken portions of scan lines A–G, indicating white cells, and binary 1 signals for scan cells overlapping the solid portion of lines A–G, indicating black cells. The cell size for a particular system is predetermined by the proximity of the sample points along the scan lines, which limits the system horizontal resolution, and the spacing of the scan lines which determines the vertical resolution.

In addition, scanner 105 is effective to generate on line 111, a pulse timing signal coincident with each of the scanner half-cell output signals on lines 112 and 114.

INPUT SECTION

The input section 110 is effective via the operation of a high speed recirculating buffer memory to transform the digital data signal from the input scanning device which is produced at relatively low rate, for example, one bit per 30 microseconds, to a relatively high rate digital signal, for example, six bits per microsecond. The uncoded high rate scan data is subsequently processed by the transmit station 10 at a correspondingly high rate so as to provide encoded scan data for gapfree transmission at uniform rate over channel 20. Input section 110 is also effective to decrease the "jitter" of the scanner detected variations in optical density of the subject copy by combining the scanner half cell signals or lines 112 and 114, using a majority count combination method. Section 110 further provides high speed data signals for subsequent processing which are representative of the detected optical density of two adjacent cells in a previously stored scan line at outputs 203 and 204 and of the detected optical density of the corresponding two adjacent cells in a current scan line at outputs 201 and 202. In addition error control signals are generated to limit the propagation of errors in a transmitted facsimile.

Figure 3:
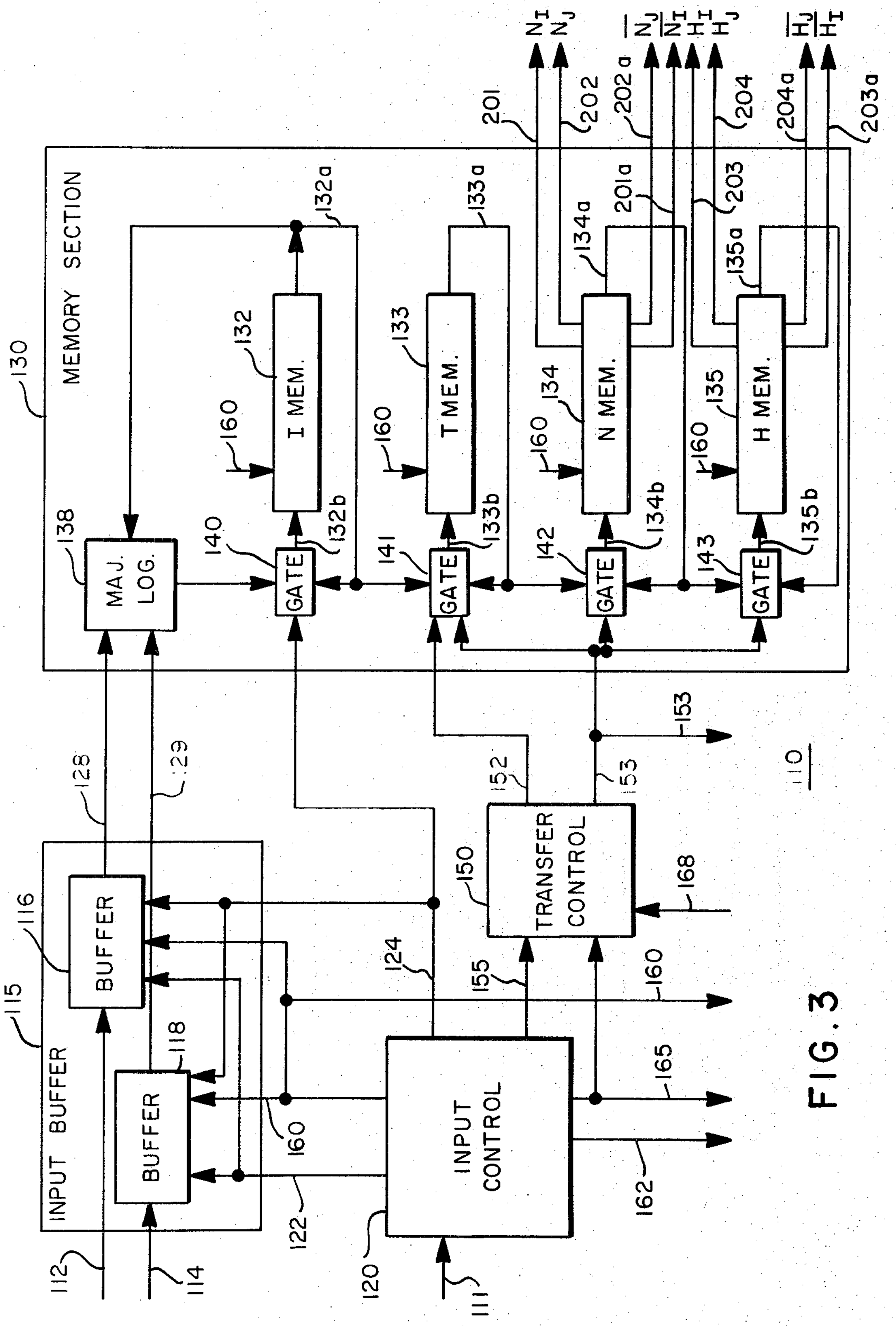
FIG. 3 illustrates in block diagram form the input section of the system in FIG. 1.

Input section 110 is shown in detailed block diagram form in FIG. 3 and includes input buffer 115, input control 120, memory section 130 and transfer control 150. As seen in that figure, scan data from the input scanner 105 are applied via lines 112 and 114 to input buffer section 115. Those scan data are in the form of two binary sequences of half cell data, with one sequence on each of lines 112 and 114. A single bit in each data sequence corresponds to the scanner 105 detected density of a portion of a scanning cell of the subject copy, with the corresponding bits in the sequences on lines 112 and 114, respectively representing a first and a second adjacent region within a cell. Thus, a pair of bits comprising a corresponding bit from each of the sequences on lines 112 and 114 represents a full cell of a scan line. Two successive pairs of bits from the data sequences on lines 112 and 114 represent adjacent cells in a scan line. In addition to the applied scan data sequences, a succession of low repetition rate clock pulses from scanner 105 are applied by a line 111 to input controller 120, which pulses are coincident with the scan data bit pairs, thereby providing a synchronizing clock signal for input section 110.

The input buffer 115 comprises buffers 116 and 118, each being 48 bit shift registers, which buffers operate in one of two modes in response to the signals from input controller 120 via lines 122 and 124. In a first data entry mode, scan data from lines 112 and 114 respectively may be clocked into the first shift register stage of the respective ones of buffers 116 and 118 in synchronism with the relatively low scanner clock rate as provided by line 111 to input control 120, i.e., at a rate equal to one bit per 30 microseconds. In a second mode, buffers 116 and 118 operate in response to a control signal from input controller 120 via line 124 in a recirculating mode. In this mode, the 48 bits of scan data stored in the respective buffers are shifted from stage to stage at a relatively high 6 bit per microsecond data rate in response to a 6MHz clock signal applied via line 160. Further, the control signal on line 124 is effective to gate the output signal from the last element to the input of the first element in the respective buffers 116 and 118 so as to recirculate the scan data through the respective buffers, i.e., from the 48th shift register stage to the first. In this manner, in the first mode of buffer operation, the relatively low rate data input from scanner 105 is accumulated and stored in the respective buffers 116 and 118 while during the second mode, the stored data is recirculated through the buffers. During the recirculate mode, output signals are applied to lines 128 and 129 respectively at the six bit per microsecond clock rate, which is consistent with further processing in input section 110.

The high speed data outputs of buffer section 115 are applied by lines 128 and 129 to memory section 130. Section 130 includes four 1804 bit memory devices, I memory 132, T memory 133, N memory 134 and H memory 135, which are interconnected for operation in two modes. In a first mode, each memory provides for high data rate recirculation of the stored data in the respective memories. As described below in conjunction with data sequence generator 210, during portions of the cycle of recirculate mode opeation, the dat in emories 134 and 135 is accessed for encoding by generator 210. In a second mode, the data stored in the respective bits of memories 132–134 is serially shifted from those memories to the respective bits of memories 133–135. The data from buffers 116 and 118 are continually shifted into memory 132 during the recirculate mode of buffer 115, as described above. In this manner, new scan line is advanced through the memory section 130 for encoding by generator 210. Four memories are required by section 130 so that two memories (134 and 135) always are filled with data for encoding, one memory (133) maintains a complete next line of scan data for use following the encoding of the data in memories 134 and 135, and a fourth (132) receives and accumulates new scan line data as made available by buffer section 115.

Each of the memories 132–135 comprises a 1798 bit glass delay line and a six bit shift register connected in series at the output end to provide a totoal capacity of 1804 bits per memory. Since scanner 105 provides 1800 bits of scan data per line, each of the 1804 bit memories 132–135 has sufficient capacity to store intact to full 1800 bit line of scan data. In addition, a four bit "line start" identifier prefix consisting of four binary 0's for each line is also stored, thereby utilizing the full 1804 bit memory capacity. Memories 132–135 are interconnected via gates 140–143 in a manner such that the outputs signals from the last shift register stage in each memory on lines **132*a*–135*a* may be applied by a respective one of gates 140–143 and lines 132*a*–135*a* to the respective inputs of the glass delay lines of memories 132–135, to thereby achieve a recirculating mode of memory operation. Memories 132–135 are also operated in a second mode such that the outputs from the last shift registers of the respective memories may be applied to the appropriate gates so that the contents of the respective memories may be transferred to the next adjacent one of the memories, for example, from memory 132 to 133, 133 to 134, etc. Control of such transfers in this mode of operation is provided by transfer control 150 via lines 152 and 153 connected to gate 144 and to gates 141–143, respectively. Memories 132–135 are also provided with clock signals at a rate of 6 bits per microsecond from input control 120 via line 160.**

In the data entry mode of operation, buffers 116 and 118 in section 115 acqure 48 bits of low rate input data from scanner 105, for example, at a rate equal to 1 bit per 30 microseconds, requiring a total of 1440 microseconds. In the buffer recirculate mode, input control 120 is effective via line 124 to recirculate once the data stored in the 48 bit registers at a 6 bit per microsecond rate, applying serially in an 8 microsecond period, each of the store 48 bits in each register to majority logic gate 138 via register output lines 128 and 129. The timing of the recirculation mode of operation of buffer 115 with respect to the data acquisition mode of memory section 130 is determined by input control 120 in a manner described below in conjunction with input control 120.

Memories 132–135 continually shift data stored therein at a 6 bit per microsecond rate in response to the clock signal applied via line 160. Except during the buffer recirculate mode of operation, i.e., during the data entry mode I memory 132 operates in a recirculate mode whereby the memory output on line 132a is applied via gat 140 to the memory input **132*b*. Thus, the 1804 bit data sequence stored in I memory 132** is recirculated continually with a 300.66 microsecond period.

During the buffer recirculate mode, control 120 is effective via line 124 and gate 140 to interrupt the recirculating operation of I memory 132 for a 8 mcirosecond period so that new data may be entered into that memory. During that 8 microsecond interruption period, the data stored in memory 132 continues to shift in response to the applied clock signal (line 160). However, gate 140 prevents the memory 132 output data on line **132*a* from being applied to input line 132*b*. Instead gate 140 is effective to apply the output of majority logic gate 138 via line 132b to the I memory input. The majority logic gate 138 output comprises a 48 bit sequence generated at a 6 bit per microsecond rate, and derived from buffers 116 and 118 and I memory 132 in accordance with the following majority logic rule: if an applied majority logic input bit pair (applied by lines 128 and 129) is either 1, 1 or 0,0, then the corresponding value (either 1 or 0) is applied in the sequence to gate 140; if an applied bit pair is of unlike value, i.e. 1,0 or 0,1, then the bit value appearing on memory output line 132 is applied in the proper sequence to gate 140. In this manner, the half cell data from scanner 105, as stored in buffers 116 and 118, is combined by majority logic 138 to form full cell data and loaded into I memory 132. Thus, if the data bits corresponding to adjacent half cells are alike, then the half cell bit value (1 or 0) is stored in memory 132, but if the half cell data bits are unlike, then the previously stored bit (as supplied by line 132*a*) corresponding to the scan value from the same scan cell in the previously stored line is restored in memory 132. The scanner 105** is thus provided with improved jitter characteristics due to the correlation of detected densities in adjacent half cell regions of the subject copy, thereby reducing quantization noise.

In summary, except during the buffer recirculate mode i.e., I memory 132 loading mode), the 1800 bit line data in memory 132, together with 4 additional bits having the value binary 0 representing a scan line start, totaling 1804 bits, recirculates in I memory 132. As the scan line data recirculates in memory 132, control 120 interrupts to load by replacement new data as received by buffers 116 and 118. In this manner a stored scan line is continually replaced with data representing the next scan line. The determination of the points of interruption for loading to ensure proper sequencing fo scan line data is made as described below in conjunction with input control 120.

The T, N and H memories 132 to 135 are similarly connected to recirculate 1804 data bits at a 6 bit per microsecond clock rate in a first mode of operation. In response to a recirculate signal applied by transfer control 150 via line 153, gates 141–143 are effective to apply the output signals from the last shift register stages of T, N and H memory 133–135 via lines **133*a* and *b*, to the respective inputs of memories 133–135, thereby providing a path for recirculation of the stored data in each memory. In a second mode of operation, as determined by a transfer signal from transfer control 150 via line 153, gate 141 is effective to interrupt to T memory recirculation for 1804 bits (300.66 microseconds) and apply binary 0 to input line 133*b* which is shifted into memory 133. In this manner T memory 133 data is unloaded and replaced with binary 0's. also in this mode (in response to the transfer signal on line 153) gate 142 is effective to interrupt the N memory 134 recirculation for 1804 bits and apply the T memory 133 output via lines 133*a* 134*b* to the N memory input. Similarly, at this time, gate 143 interrupts the H memory recirculation for 1804 bits and applies the N memory output via lines 134*a* and 135*b* to the H memory input. In this manner, two complete 1804 bit scan line data signals are transferred: a first from N memory 134 to H memory 135, and a second from T memory 133 to N memory 134, leavin the T memory unloaded having 1804** bits equal to binary 0. Following such scan line data transfers, gates 141–143 return to the above described first mode of operation, wherein the T, N, and H memory contents are continually recirculated.

When T memory 133 is thereby unloaded, gate 141 is responsive to input control 120 via line 152, transfer control 150, and line 155. At such time following detection by control 120 that I memory 132 is loaded with a complete new line of scan data, a transfer signal applied via line 152 to gate 141. Then, gate 141 is effective to apply via lines 132a and 133b the output of I memory 132 to the input of T memory for an 1804 bit period (300.06 microseconds) so that the new scan line is stored in T memory 133 for subsequent transfer to N memory 134. At all other times gate 141 operates as described above in the data acquisition and recirculate mode. The generation of the transfer signal on line 152 is described more fully below in conjunction with transfer control 150. In this manner, encoder input system 110 acquires full 1800 bit scan line data from low rate scanner 105, transforms such data to a high data rate, forms and stores full cell data as received in a first memory together with a four bit line start signal (I memory 132) stores such data for a full line in a temporary buffer memory (T memory 133) and stores successive two 1800 bit scan line data sequences (N and H memories 134 and 135) together with four bit line start identifiers.

Output lines 203 and 204 from memory 135 are connected to the output stages of two successive shift registers in memory 135. Similarly, output lines 201 and 202 are connected to the corresponding pair of successive shift registers in memory 134. In this manner, the bits on lines 203 and 204 correspond to a first detected bit of full cell data and a next adjacent detected bit in a stored scan line signal. Similarly, the bit pairs of lines 201 and 202 correspond to the same first and next adjacent bits of full cell data in the next subsequent scan line. Lines 203 and 204 are hereinafter referred to as $H_J$ and $H_I$ outputs, respectively, and lines 201 and 202 referred to as $N_J$ and $N_I$ outputs, respectively. The corresponding complementary shift register outputs are applied via the respective ones of lines 201a and 204a.

Figure 4:
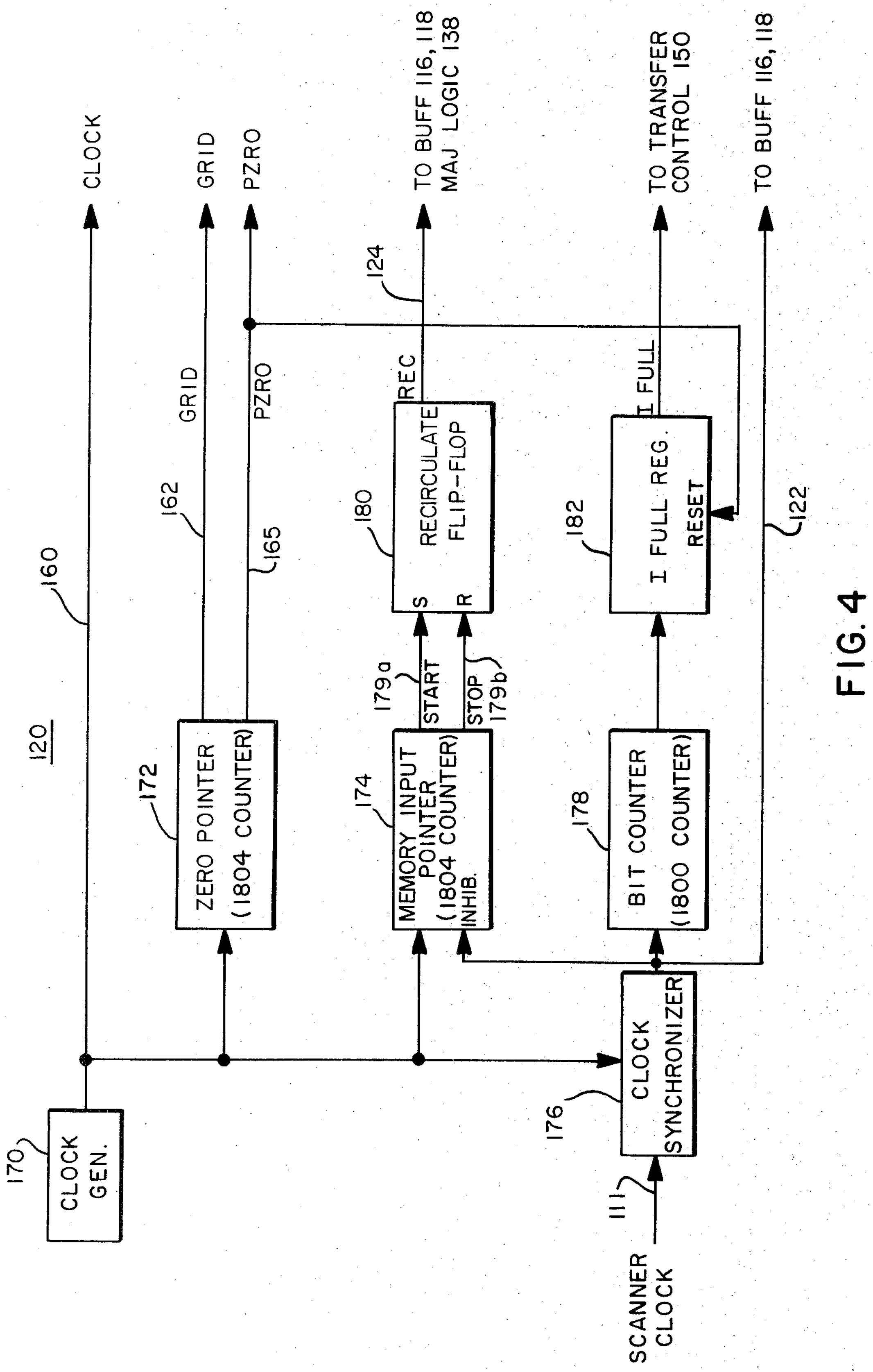
FIG. 4 illustrates in block diagram form the input control of the system in FIG. 3.

Input control 120 is shown in detailed block diagram form in FIG. 4. In brief, a first function of control 120 is to provide timing and control signals via lines 122, 124 and 160 which are required to transform the low rate scan line data into high rate memory data and a load that data into memory 132. This function is performed in part by clock generator 170, which provides on line 160 the high speed 6MHz clock signal. In addition, clock synchronizer 176 provides on line 122 a modified form of the scanner clock signal on line 111 for transferring new scanner data from lines 112 and 114 to buffer 115. Input pointer 175 anf recirculate flip flop 180 provide on line 124 a control signal to enable buffer 115 operation in the above described recirculate mode for transferring new scan line data to memory section 130. Control 120 also provides the high rate clock signal (6MHz) on line 160 to enable data recirculation in m memories 132–135. An additional function of control 120 is provided reference timing signals via lines 165 and 162 for subsequent processing in transmit station 10. Zero pointer 172 provides a first reference pulse signal on line 165 to indicate that clock period in which the first bits in the respective lines of scan data as stored in memories 132–135 (representing the first cell in a scan line) are applied at the output lines 132a–135a of those memories. Zero pointer 172 also provides reference pulse signals on line 162 to indicate those clock periods in which the 600 th and 1200th bits in the respective scan line data are so applied. A further control signal is generated on line 155 to indicate the complete replacement of an old line by a new line of scan data in memory 132. This signal is applied via line 155 to transfer control 150 (FIG. 5) for initiating a transfer of a new line of scan data from memory 132 to memory 133, as described herein below.

The 6MHz clock signals for input section 110 are produced by clock generator 170 on line 160. The clock signal on line 160 is applied to the input terminals of zero pointer 172, memory input pointer 174, clock synchronizer 176, and also to memories 132–135 in memory section 130 and to buffers 116 and 118 in input buffer 115. A second input to clock synchronizer 176 is provided by the low rate scanner clock signal as applied via line 111. Zero pointer 172 is an 1804 counter having decoding circuits to produce an output on line 165 coincident with the count 1 state of pointer 172 and an output on line 162 coincident with the count 600 and count 1200 state of pointer 172. Line 165 is connected to the reset input of shift register 182. The clock sycnhronizer 176 output on line 122 is applied to the count input of bit counter 178, the inhibit input of input pointer 174 and to buffers 116 and 118 in input buffer 115. The output of counter 178 is applied via line 178a to shift register 182 and line 155 to transfer control 150. The two outputs of input pointer 174 are applied via lines 179a and b respectively to the set and reset inputs of recurculate flip flop 180 whose output is applied via line 124 to buffers 116 and 118 in input buffer 115 and to gate 140 in memory section 130. A detailed description of the operation of control 120 follows immediately below.

In operation, the clock generator 170 produces a 6MHz signal thereby providing a speed clock signal for buffers 116 and 118 in memory section 130. Zero pointer 172 is an 1804 counter and provides on lines 162 and 165 reference pulse signals for subsequent processing coincident with every first, 600th, and 1200th successive clock pulses in a cycle of pointer 172 operation. The output signal coincident with the first clock pulse (line 165) is hereinafter referred to as PZRO and represents the reference point in time of the start of a scan line. The 600th and 1200th pulse outputs are hereinafter referred to as GRID signals and reference points within a scan line subsequently used for error control, as described below in conjunction with data sequence generator 210. Clock synchronizer 176 is effective to transform the low rate scanner clock signal on line 111 to a pulse signal on line 122 having the same repetition rate as said scanner clock signal but having a pulse duration equal to a single high clock rate bit. Input pointer 174 is an 1804 counter and is effective to produce an incrementing count output in response to successively applied clock signals from line 160 excepting those clock signals coincident with the scanner clock signals as applied by clock synchronizer 176 to the inhibit input of pointer 174. The input pointer 174 output pulse signals on lines 179a and 179b are respectively generated by appropriate logic gating to be coincident with the count 1756 and count 1804 states of input pointer 174. These pulse signals are effective to respectively set and reset recirculate flip flop 180. In this manner, flip flop 180 is driven to be in the binary 1 state for a sequence of 48 consecutive clock periods beginning with that period associated with the pulse following count 1756 of input pointer 174, and in the binary 0 state for the remainder of the input pointer 174 count states beginning with that period associated with the pulse following the count 1804 of input pointer 174. The resultant output of recirculate flip flop 180 is a pulse signal having a duration signal to 48 bit periods (8 microseconds) This recirculate signal is applied by line 124 to buffers 116 and 118 and to gate 140 in memory section 130 where the signal is effective to accomplish the aforedescribed transfer of 48 bits of scan line data from buffers 116 and 118 via majority logic 138 and gate 140 into I memory 132, in the manner described above in connection with FIG 3.

The manner in which input control 120 is effective to load successive groups of 48 data bits into I memory 132 in the proper time sequence so as to achieve a contiguous 1804 bit scan line may now be described. Assuming initially that zero pointer 172 and input pointer 174 simultaneously at count 1 states, then the PZRO signal on line 165 is coincident with the return of the flip flop output signal on line 179*b* to binary 0, that coincidence being indicative of the start of a new line of scan data. As clock generator 170 produces successive clock pulses, zero pointer 172 is effective to increment its count state in response thereto. Assuming for the moment that no scanner clock pulses are applied via line 111 (and hence no new scan data is applied via lines 112 and 114) input pointer 174 also is effective to increase its count state in response to the applied clock pulses on line 160. At the time at which input pointer 174 reaches a count 11756 state, recirculate flip flop 180 is set and the resulting output binary 1 signal is applied via line 124 to buffers 116 and 118 and gate 140 so that the next 48 clock pulses (corresponding to an 8 microsecond period) are effective to recirculate the data in buffers 116 and 118 and to load the 48 bits from those buffers via majority logic 138 and gate 140 into I memory 132. Coincident with the 48th of said clock pulses input pointer 174 reaches count 1804 state and produces a corresponding output via line 179*b* which resets flip flop 180 output to binary 0 and in turn disables via line 124 the data recirculation in buffers 116 and 118 and the loading of memory 132. At the next clock pulse on line 160, both zero pointer 174 and input pointer 174 return to their respective count 1 states. Operation of input control 120 similarly continues until a scan cell data pair is applied to input buffer 115 via lines 112 and 114 and an accompanying scan clock signal is applied via line 111 to clock sunchronize 176. At such a time, clock synchronizer 176 is effective to generate a pulse signal having a duration equal to one 6MHz clock period and to apply that signal to the inhibit input of input pointer 174, thereby disabling that pointer from counting the clock pulse on line 160 which is applied during that interval. As a result of this operation the count state of input pointer 174 is displaced by a count of 1 from the corresponding count state of zero pointer 172. Thus, as input pointer 174 reaches its count 1756 state, the recirculate signal generated by flip flop 180 is displaced in time by 1 bit period from the corresponding recirculate signal described previously (with respect to the zero pointer output signal PZRO). The resulting I memory 132 load operation is thereby similarly delayed with respect to that of the previous cycling of zero pointer 172. Similarly for each subsequently applied scan data half cell bit pair on lines 112 and 114, the count state of input pointer 174 is disposed further with respect to the corresponding count state of zero pointer 172. In this manner, the successive I memory 132 load operations are delayed with respect to the PZRO signal by the number of received scan line data pairs. Thus successvie scan line data pairs are stored in time sequence in I memory 132.

The output from clock synchronizer 176 is further applied to bit counter 178 which is an 1800 counter and is effective to produce on line 155 upon reaching a count 1800 state a pulse signal indicating that 1800 scan data bit pairs have been received by input buffer 115 and loaded into I memory 132, and, consequently, that memory 132 is completely loaded with a full line of scan data. At such a point in time, the count state of input pointer 174 has completely precessed with respect to the counts state of zero pointer 172 such that the next subsequent PZRO signal 165 is coincident with a count 1 output signal on line 179*b*. It will be understood in the description hereinabove and as follows that the elements of input control 120 operate in a synchronous fashion, i.e., all state changes are in response to clock pulse on line 160.

The output of bit counter 178 produces on line 178*a* a binary 1 signal in response to the reception of the 1800th bit of scan line data, representing the completion of the loading into memory 132 of a full scan line. Following this change in level on line 178*a*, the next succeeding clock probe on line 160 is effective to set IFULL register 182 to binary 1, the output of which is applied via line 155 to indicate the full state of I memory 132. Register 182 remains in the binary 1 state until the next subsequent PZRO pulse on line 165 in conjunction with the transfer signal on line 152. whereupon register 182 is reset to binary 0.

Figure 5:
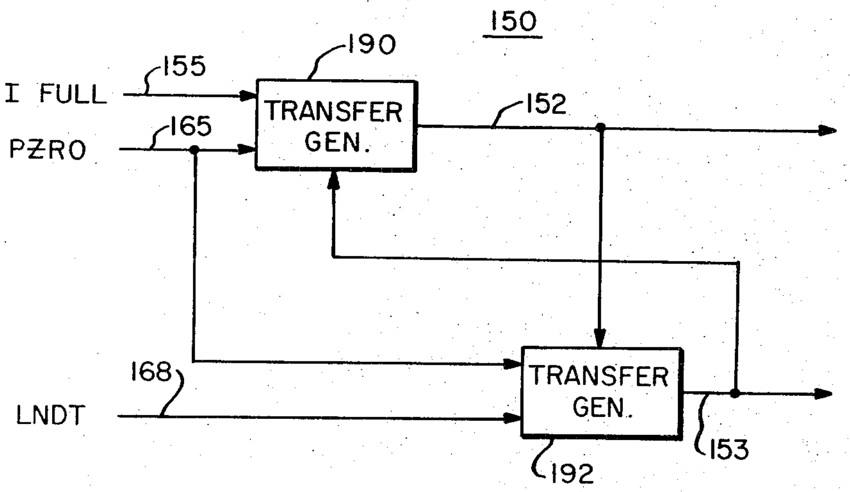
FIG. 5 illustrates in block diagram form the transfer control of the system in FIG. 3.

Transfer control 150 is shown in block diagram form in FIG. 5. In brief, the primary functin of control 150 is to generate, in response to a data request signal from data sequence generator 210, a control signal on line 153 which is applied to memory section 130. This signal effecuates a simultaneous serial transfer of stored lines of scan data from memories 133 to 134 and 134 to 135, so taht the data in N and H meories represent the next pair of adjacent scan lines. Following this transfer, transfer control 150 generates a control signal on line 152 in response to the indication applied by line 155 that memory 132 is fully loaded with a new scan line. This signal initiates the transfer of that new scan line data from I memory 132 to T memory 133. In transfer control 150, lines 155 and 165 provide inputs to a first transfer generator 190 whose output is applied via line 152 to a second transfer generator 192 and also to memory section 130. Additional input lines 168 and 165 are provided for generator 192 whose output 153 is applied to memory section 130.

In operation, a binary 1 signal on line 155 (indicating the full state of memory 132) enables transfer generator 190 to detect the next subsequent PZRO signal on line 165 and, in response thereto, produce a binary 1 signal on line 152. This signal on line 152 in turn enables the I-to-T memory transfer gate 141 in memory 130 to transfer stored data from memory 132 to memory 133 as described above in conjunction with FIG. 3. The next successive PZRO signal (1804 bits periods later) on line 165 is effective to return the level on output line 152 (of generator 190) to the binary 0 state, thereby terminating the I-to-T memory transfer signal on line 152. In this manner, gate 141 in memory section 130 is effective to apply the I memory output to the T memory input for a period of 1804 bits, thereby accomplishing a transfer of a full line of scan line data to the T memory 133.

Figure 6:
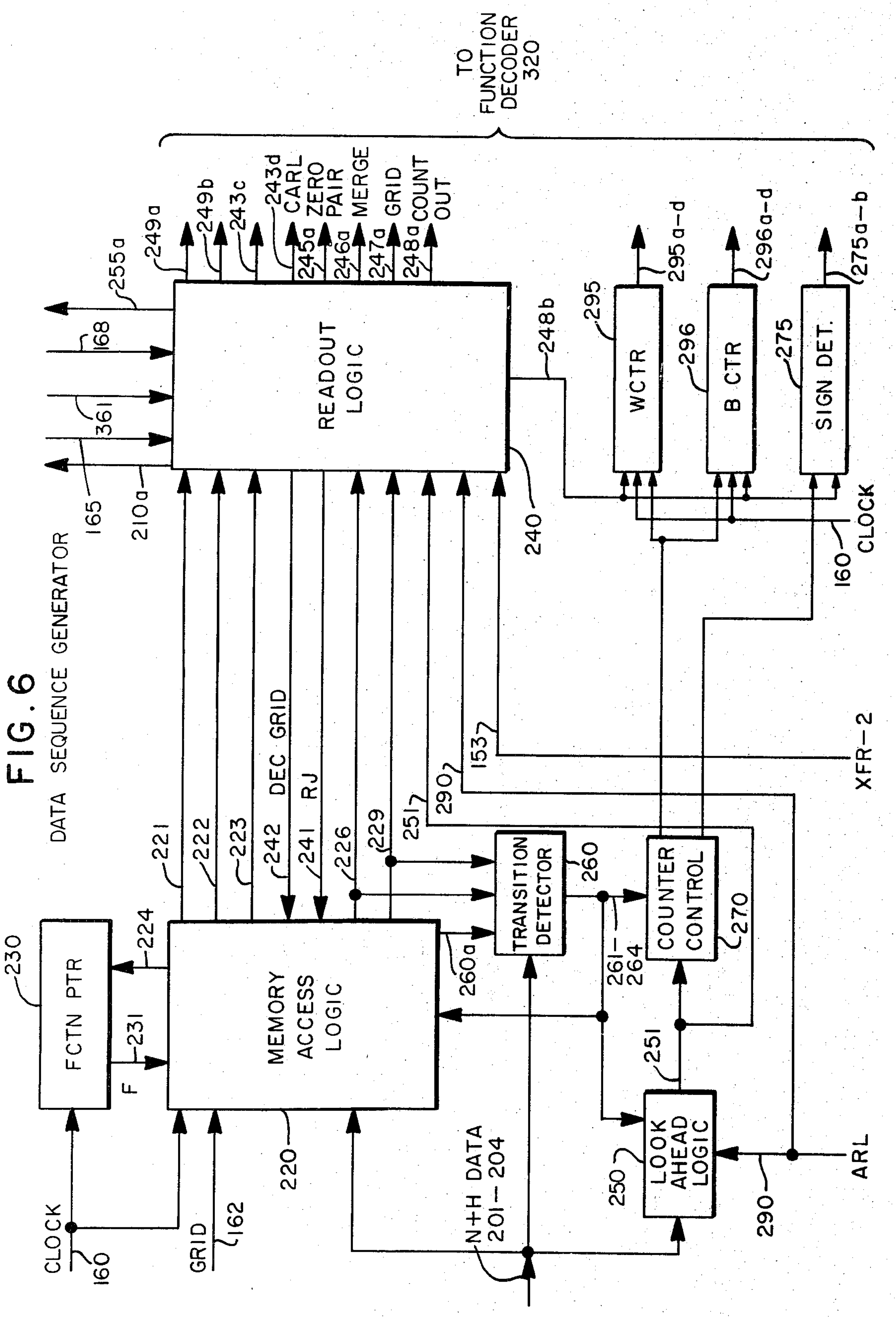
FIG. 6 illustrates in block diagram form the data sequence generator of the system in FIG. 1.

The I-to-T memory transfer signal on line 152 is also applied to generator 192, which generator responds to the downward transition in said applied signal to activate generator 192. Upon being so activated and then and then following the application of a line data transfer signal on line 168(as applied by the data sequence generator 210 described hereinbelow in conjunction with FIG. 6) generator 192 is responsive to the first PZRO signal on line 165 to produce a binary 1 T-to-N and N-to-H memory transfer signal, on line 153 which is in turn applied to gates 141–143 in memory section 130. The next subsequent PZRO on line 165 is effective to terminate this binary 1 transfer signal on line 153. The signal on line 153 is also applied to generator 190 wherein the binary 1 to 0 transition signifying the end of the T-to-N and N-to-H memory transfer opeation is effective to activate transfer generator 190 so that the next coincidence of binary 1 signals on lines 155 and 165 will be effective to repeat the previously described operation.

Thus, at such time when the I memory 132 is completely full (as indicated by the signal on line 155, and the T memory is completely empty—as indicated by the data transition of the signal on line 153) the next PZRO signal (indicating the start of a full line of scan dequence data in the recirculation mode of the memories) is effective to produce via generator 190 an I to T memory transfer signal, which is applied by line 152 to gate 141. In response thereto gate 141 is effective to apply the I memory input signal to the input of T memory 132 as described in conjunction with FIG. 3. In this manner a new line of scan data stored in I memory 132 may be effectively loaded into T memory 133. The trailing edge of the enabling pulse signal on line 152 provides an indication that the T memory 133 is now filled with a new line of scan data. Thereupon, the next PZRO signal wich is coincident with a line data transfer request as generated by data sequence generator 210 is effective to produce via generator 192 the transfer signals required to transfer out the formerly stored line of scan data from H memory 135 and replace such data with a more recent line of scan data from H memory 135 and replace such data with a more recent line of scan data from N memory 134. Simultaneously, a still more recent line of scan data is transferred from T memory 133 to N memory 134.

DATA SEQUENCE GENERATOR

Data Sequence Generator 210 (FIG. 6) is effective to generate, in an approprite time sequence, coded representations of successive stored scan line data. In a cycle of operation, for a full scan line, the high speed recirculating scan line data in the H and N memories 134 and 135 are processed by memory access logic 220 in response to a data request signal from readout logic 240. The precise point in time of the commencement of an access to the recirculating data memories 134 and 135 is determined by function pointer 230, thus assuring integrity of a transmitted scan line. The duration of a memory access operation is controlled by transition detector 260 as described in conjunction with FIGS. 7 and 8. As there described, the particular bits in the recirculating data memories which may be accessed in a particular circulation of the data stored in memories 134 and 135 are determined in part by the function pointer 230 output signal and the time relation of that signal to the zero pointer 172 output signal, PZRO (the latter references the starting point of a scan line data within the recirculating data stream in H and N memories) and in part by the functional stat of transition detector 260.

The signal processing accompanying a memory access operation may be performed in either of the two encoding modes, absolute run length (ARL) or correlation (CORREL). In the described embodiment, the scan lines are encoded in a selected one of those modes in accordance with a repetitive twenty scan line cycle, the first line of each cycle being ARL and the next nineteen lines being CORREL. Encoding is performed in the ARL mode in response to a control signal on line 290 from mode control 360, as described below, and the CORREL mode in response to control signals from look ahead logic 250. As described in conjunction with FIG. 8, a scan line which is to be encoded in the CORREL mode may have segments (determined by look ahead logic 250) encoded in the ARL mode. Counter control 270 is effective in response to signals from logic 250 to direct counters 295 and 296 to generate the appropriately coded signals for the memory data.

In the ARL mode, the successive bits of the scan line data in N memory 134 are detected and count signals are produced by white and black counters, 295 and 296 corresponding to the number of consecutive white and consecutive black bits, respectively, in every white-black segment of the stored scan line data. This operation is repetitively performed for each of such segments during the memory access period in which data sequence generator 210 operates in the ARL mode.

In the CORREL mode, count signals are produced by white and black counters 295 and 296 as a measure of the differences in the run lengths for associated pairs of black bit sequences in two adjacent scan lines (as determined from the scan line data stored in both N and H memories 134 and 135). The memory access period in which the above described count signals are produced in the CORREL mode is terminated at points in time as described in detail below in conjunction with FIG. 8.

Memory access logic 220 is effective in both the ARL and CORREL modes to initiate a memory access operation in response to a data request signal from readout logic 240 (line 241) and followed by a control signal from function pointer 230 (line 231). A memory access operation continues uninterrupted until a second control signal is received by logic 220 from function pointer 230. The period during which the memory access operation continues is referred to as the memory access period. During a memory access period, access logic 220 may perform three primary functions. In the CORREL mode, a first function is MERGE detection, whereby the succession of scan line data bits from the H and N memories (lines 201–204) is processed to identify a line segment in which H memory 135 contains a black run while the corresponding N memory cells remain white. A second function performed in the CORREL mode is ZERO PAIR detection, whereby the succession of recirculating H and N memory bits are processed to identify segments having identical black runs in the corresponding cells of both memories. Following the identification of either a MERGE or ZERO PAIR condition, an appropriate control signal is applied to readout logic 240 by a respective one of lines 222 and 221. These functions are described more fully hereinbelow in conjunction with FIG. 8. In addition, during a memory access period, logic 220 performs a third function, GRID count, in both the ARL and CORREL modes during which the grid reference signals generated as described above (by zero pointer 172 on line 162) are counted and stored for subsequent transmission over channel 20 to a remote receiver. The transmitted grid signals are used at the remote receiver to provide reference points in the received data, marking the one-third and two-thirds points in a line of scan data. In performing the grid count function during a memory access period, memory access logic 220 increments a counter in logic 220 in response to a grid signal applied from input section 110 via line 162 (coincident with the 600th (one-third point) and 1200th (two-thirds point) bits of a scan line, as described previously in conjunction with input section 110). Logic 220 provides an output signal on line 223 at all times when the grid counter maintains a count state not equal to zero. Following the memory access period, the encoded data for the segment is transferred to function decoder 320 under control of readout logic 240, as described below. The segment is followed sequentially by as many as two grid signals generated in logic 240 in response to the grid count signal applied on line 223. As a grid signal is so transferred, the grid count in access logic 220 is decreased by a count of one in response to a control signal from readout logic 240 on line 242. No further grid signals are transferred after the grid count reaches zero. Thus, the number of transferred grid signals accompanying each data readout operation accomplished by readout logic 240 equals the number of grid pulses received via line 162 during the just terminated memory access period. It will be understood that the grid counter in logic 220 is reset to count zero at the start of each access period.

The particular data bits encoded during a segment are determined by function pointer 230 following a data request control signal from readout logic 240 (line 241). Pointer 230 comprises a modulo 1804 counter which increments in response to clock pulses applied via line 160. The first clock pulse applied to that counter following the occurrence of the 1804 count state is effective to provide a control signal via line 231 to logic 220. This signal, in combination with the next appearing data request control signal (line 241), initiates a memory access period by applying an appropriate control signal to transition detector 260 via line 229. A signal applied to function pointer 230 resets that pointer to zero via line 224 to ensure that the starting point in a next memory access period will correspond to the next data to be encoded. Following the initiation of a memory access period, function pointer 230 may be reset a second time to the count one state in response to control signals (described more fully hereinbelow) in order to "mark" the point in a recirculation cycle of memories 134 and 135 at which the next subsequent memory access period is to begin during the next circulation of data in the H and N memories. Thus, at a point in time within a memory access period, function pointer 230 may be reset to its count one state in order that the next memory access cycle commence 1804 clock periods later, thereby providing that the next bit pair processed from N and H memories 134 and 135 corresponds to the cell adjacent to the cell associated with last N memory bit processed in the previous access cycle. The recirculating scan line data in N memory 134 may thereby be encoded in segments (which relate to corresponding segments in H memory 135) wherein each segment is encoded during separate memory access periods occurring in successive circulations of the scan data in memories 134 and 135.

In this manner, the integrity of a transmitted scan line is assured. Following the termination of memory access period, look ahead logic 250 is enabled for an appropriate access period so that the next successive bits of memory data following the just encoded segment may be processed to determine the mode of encoding operation to be reformed during the next memory access period, i.e., either ARL or CORREL.

Figure 7:
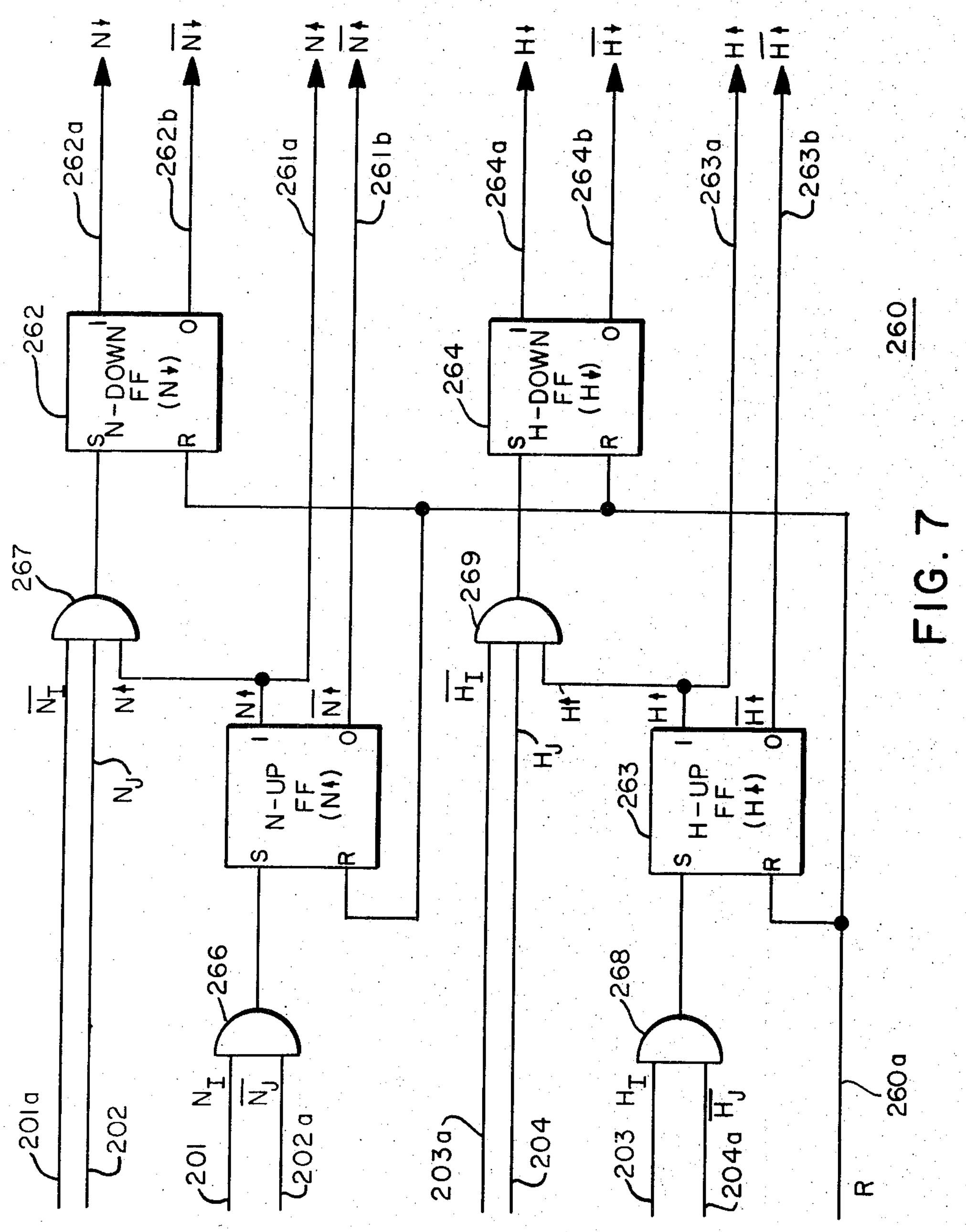
FIG. 7 illustrates in block diagram form the transition detector of the data sequence generator of FIG. 6.
Figure 8:
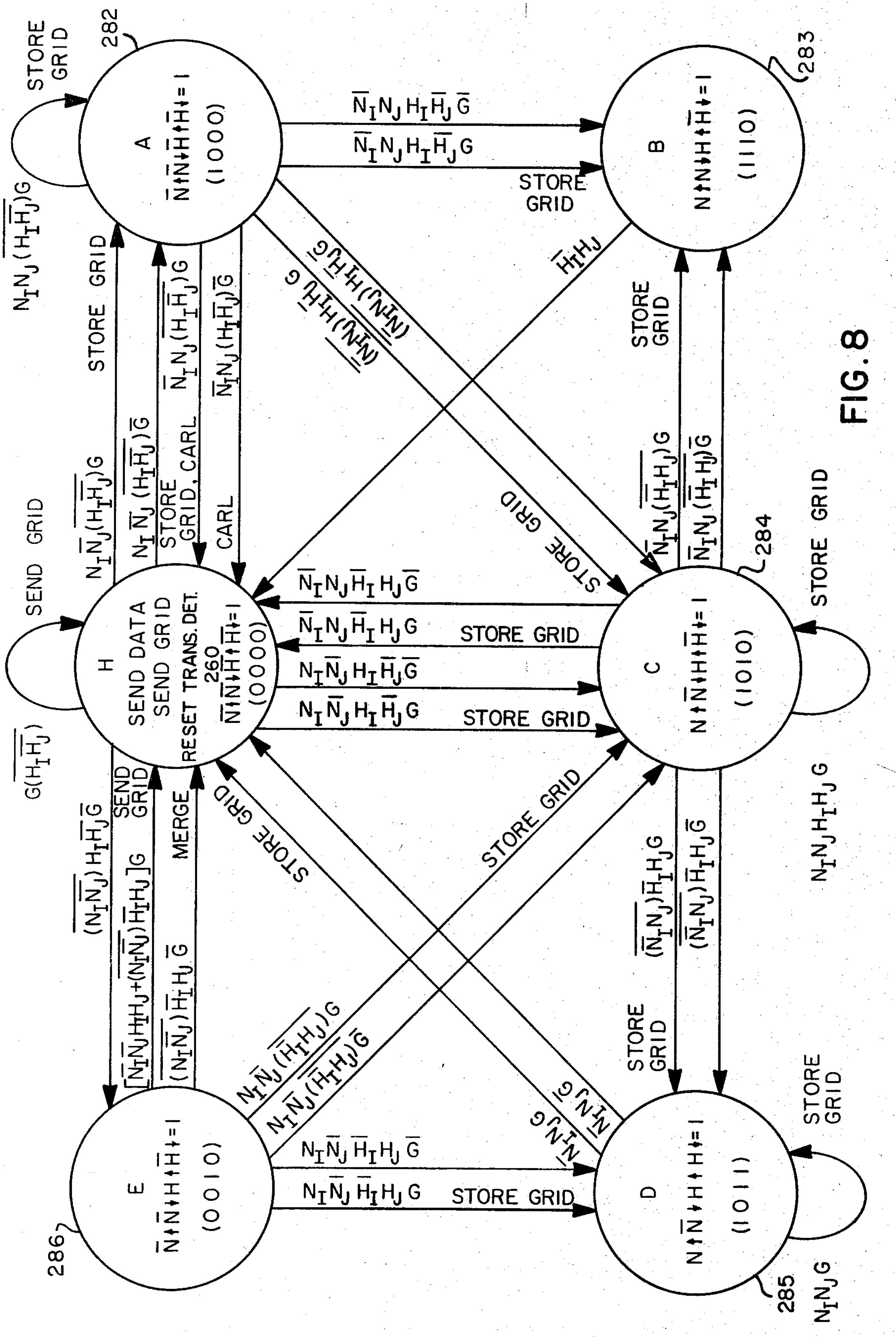
FIG. 8 illustrates in schematic form a state diagram for the operation of the data sequence generator of FIG. 6.

In the CORREL mode, the operation of memory access logic 220 may be more fully understood by reference to FIGS. 7 and 8. FIG. 7 shows in detail transition detector 260. It will be understood that the four flip-flops 261–264 of transition detector 260 may be synchronous in operation, i.e., the flip-flops change state only in response to a timing signal applied to a clock input, although FIG. 7 shows those flip-flops as set-reset flip-flops for simplicity. The $N_I$, $N_J$ and $H_I$, $H_J$ signals on the respective ones of lines 201–204 represent the "future (I)" and "current (J)" cells for the respective "current" scan line (N memory 134) and "preceding" scan line (H memory 135). The signals on line *201a–204a* represent the binary complements of the corresponding ones of lines 201–204. These signals are applied from the I and J shift register stages of both N memory 234 and H memory 235 via the indicated signal lines and gates 266–269 to the set inputs of flip-flops 261–264 in detector 260. The gating is such that a transition from white to black (binary 0 to 1) in the adjacent current and future cells of a scan line (as stored in I and J shift register stage of N memory 234) is effective to set N-up flip-flop 261, the N memory "up transition" detector. The N memory "down transition" flip-flop 262 is set in response to a 1 to 0 transition as detected in the I and J shift register stage of N memory 134, provided that previously the N-up flip-flop 261 has been set. Similarly, a detection of the 0 to 1 transition (white to black) is recorded by the H "up transistor" detector flip-flop 26 and a detection of 1 to 0 (black to white) in the adjacent I and J shift registers of H memory 235, following the setting of H "up transition" flipflop 263, is recorded by H "down transition" flip-flop 264. The output of the respective flip-flops 261–264 and their complements are provided on the respective lines *261a* and b through *264a* and *b.* In FIGS. 7 and 8 these output signals are indicated by the appropriate letter N or H followed by a vertical arrow appropriately pointed up or down. The "state" of memory access logic 220 may be understood to depend on the state of the four flip-flops 261–264 in detector 260.

FIG. 8 shows a state diagram of sequence generator 210 operation in the CORREL mode. The six states 281–286 shown in the figure correspond to the indicated states of the four flipflops 261–264 in transition detector 260, i.e., the four bit binary number shown in each of states 281–286 correspond to the respective outputs of flip-flops 261–264, which may be represented by a 4 bit binary word, each bit corresponding to a respective flip-flop output. Thus, in accordance with FIG. 8, the outputs from 260 may be represented as 1000, 1010, 0010 and 0000. The boolean expression denoting the output state of the detector 260 flip-flops is also shown in FIG. 8. In those expressions, the boolean variables N and H followed by an appropriately oriented vertical arrow refer to the respective flip-flops 261–264. These states 281–286 are referred to hereinbelow as A, B, C, D, E and H, respectively. It will be understood that detector 260 responds to successive clock pulses (from line 160) during the memory access period to either remain in or transfer to one of the aforementioned states. The boolean expressions adjacent to the transition arrows between the various states indicate the appropriate combination of signals required for a particular state transition. The boolean variables $N_I$, $N_J$, $H_I$ and $H_J$ refer to the outputs of the respective shift registers in N and H memories 134 and 135. The boolean variable G corresponds to the output of the grid counter in memory access logic 220 (line 223) on which the pressure of a grid pulse is indicated by a binary 1. It will be understood that a bar over a boolean variable indicates the complement of that variable. Certain of the transition arrow in FIG. 8 include indications of operations performed when that arrow is traversed, e.g., "store grid" indicates that the grid counter in logic 220 is incremented, "send grid" indicates that logic 240 applies an appropriate grid signal to function decoder 320, MERGE indicates a MERGE condition signal is transferred to logic 240 via line 222 and CARL indicates a NEW START or ARL format is to be used in encoding the current segment.

If, for example, during a memory access period, the detector 260 is in an initial state and the appropriate combination of H and N memory bits (corresponding to the boolean expression on one of the transition arrow from the initial state) is applied to detector 260, then the next clock pulse received is effective to transfer detector 260 from the initial state to the state indicated by the transition arrow. If no such combination of inputs is applied, then detector 260 does not change state in response to the clock pulse.

In operation, a memory access cycle always commences with detector 260 in the "home" state, H. In response to the signals applied to the transition detector 260 from memories 134 and 135, transition detector 260 may change from state H to either state A, C or E if the appropriate I and J shift register output signals (as indicated on the appropriate state transition arrow in FIG. 8) are applied to detector 260. Similarly subsequent changes in state of detector 260 result from the corresponding logic signals on the associated arrow and direct transition detector to go to the respective one of states B, D, E or H. In general, a transition from any of states A through E to the home state H results in the termination of the current memory access period and is accompanied by the resetting of flip-flops 261–264 in detector 260 by a signal on line 260*a* from access logic 220. At such time any encoded scan line data which has been determined during the current memory access period by W and B counters 295 and 296 (as described in more detail below) is transferred under the control of readout logic 240 to function decoder 320. It will be understood that prior to or coincident with the termination of a memory access period, function pointer 230 is reset to count the one state to mark the point in recirculating memories 134 and 135 where the next access is to start. Detector 260 remains in the H state until the commencement of the next memory access period as initiated by function pointer 230.

An exception to this general rule is the case where the successive scan line bits are such that detector 260 changes from state H to state C and back to state H following the start of a memory access period. Such a case indicates that a black run as stored in the current scan line memory (N memory 134) is coincident with an identical black run in the previous scan line memoray (H memory 135). Such an identical pair of black runs is referred to hereinbelow as a "zero pair." In response to the detection of a zero pair, memory access logic 220 is effective to apply a signal via line 221 to readout logic 240. In the herein described embodiment, the occurrence of successive substantially similar scan lines is highly probable and the resultant channel encoding for an identical black pair (described below in conjunction with Sholtz encoder 370) is assigned a minimum length channel code, e.g. two bits. Further, in the present embodiment, a memory access period may only terminate after the generation of at least four bits of channel encoded data. Thus, following an identical pair of black runs at the start of an access, the return of detector to the H state does not terminate the memory access period. A second zero pair during an access however would provide the necessary four bits of channel encoded data (two bits from each zero pair) so that the return to state H would be effective to terminate the memory access.

Although the memory access period may be terminated only by a return to state H, whereupon the encoded segment may be transferred under control of readout logic 240, there are several conditions in response to which the function pointer 230 is reset prior to the termination of a memory access. In such cases, a memory access logic 220, continues to complete the line encoding for the segment before directing the transfer of the resultant encoded segment at the termination of the memory access (marked by the return by detector 260 to state H. In the meantime, function pointer 230 may be reset at an earlier point in the access period so that the next memory access overlaps cells processed during the previous access. In this manner, associated black runs in adjacent scan lines may be encoded in the DELTA format and additional black runs which may overlap one of the associated black runs may be appropriately processed in either the MERGE or NEW START format.

In CORREL mode operation, at the beginning of a memory access period, a transition of the H memory 235 from white to black (binary 0 to 1), while N memory 234 remains unchanged, is effective to change transition detector 260 from state H to state E. If the next subsequent bit pair (representing the next adjacent cell) shows no further change in the bit pair compared with the previous bit pair then detector 260 remains in state E. If, in a subsequent comparison, the H memory bit reverts to white and a grid bit is not indicated via line 223 then detector 260 changes from state E to the home state H. Following this transition, memory access logic 220 is effective to indicate a MERGE condition on line 222, i.e., a period in which the N memory (current scan line) remained constant white while H memory (preceding scan line) went from white to black and to white again. The signal indicating the MERGE condition is transferred via line 222 to readout logic 240.

At the beginning of a subsequent memory access period, a transition of N memory 234 from white to black, with no change in H memory 235, results in detector 260 changing to state A. Upon the return of N memory 234 to white on a subsequent comparison not accompanied or preceded by the change of H memory 235 to black results in detector 260 returning to the home state H. This transition is indicative of a NEW START condition, i.e., a period in which the H memory data remained unchanged white while the new line data in N memory went from white to black to white again. In response to this condition, ARL mode count signals for the white and black runs of the preceding segment are transferred from counters 295 and 296 to function decoder 320. Similarly, other combinations of scan data in memories 134 and 135 produce other excursions of detector 260 in accordance with the state diagram of FIG. 8. The output signals produced by detector 260 may be applied to any suitable form of combinational logic devices known in the art to provide the appropriate functional operation as described above. For example, a similar logic implementation is shown in pending U.S. application, Ser. No. 5642, filed Jan. 26, 1970.

Look ahead logic 250 is effective immediately, following the second resetting of function pointer 230 in a memory access period, to determine the encoding mode (ARL or CORREL) for the next subsequent memory access period. In operation, the H and N memory data on lines 201–204, together with the transition detector 260 output signals (lines 261a-b through 264*a–b*) are gated by logic 250 to determine the point in time at which function pointer 230 is reset for the second time in a memory access period, i.e., the last bit in a memory access period prior to the return of detector 260 to state H. In response the detection thereof, logic 250 is actuated to start a look ahead access period. During this look ahead access period, logic 250 is effective by means of a transition detector (substantially the same as the transition detector 260 which is actuated during the previously described memory access period) to determine from the applied H and N memory data the state changed which will be undergone by detector 260 in the next memory access period. Logic 250 is then effective to apply an appropriate signal via line 251 to counter control 270 which in turn enables counter 295 and 296 at the appropriate times during that next memory access period, in accordance with the encoding mode determination of logic 250.

In response to an appropriate control signal on line 290 from mode control 360, look ahead logic 250 determines that encoding during the next memory access is to be performed in the ARL mode irrespective of the state of detector 260. Logic 250 is thereupon effective to generate the appropriate signal on line 251 so that, during the next memory access period, counter control 270 operates white and black counters 295 and 296 in the ARL mode. Both counters 295 and 296 are binary counters which increment in response to clock pulses applied via line 160 when actuated by the appropriate signal from control 270. Counters 295 and 296 do not change state when disabled, i.e., when no actuating signal is applied. In the ARL mode, counter 295 is actuated by control 270 in response to signals from detector 260 at the start of an access period and remains so actuated until the N memory J data bit (line 203) changes from white to black (binary 0 to 1) as the stored data circulates. At such time as the N memory J data bit changes from white to black, control 270 disables counter 295 and activates counter 296 until the N memory J data bit returns to white. thereby marking the termination of the current memory access period.

Alternatively, in the CORRELL mode, look ahead logic 250 may determine that detector 260 is to change from state H to E and back to H in succession, that the segment data is to be encoded in the NEW START format. In response thereto, control 270 is again effective to generate the appropriate signal on line 251 so that counters 295 and 296 operate in the ARL mode, as described above, during that next segment to be encoded.

Similarly, logic 250 may be effective to determine that encoding be performed in the DELTA format. Counter control 270 thereupon directs counter 295 to commence counting in the next memory access period in response to detector 260 changing from state H to either state A or E. control 270 later disables counter 295 in response to the subsequent transition of detector 260 from the respective one of states A or E to the appropriate one of state B, C or D. Sign detector 275 is also responsive to control 270 and provides a single bit output signal on line 275*a* which is a binary 1 in response to detector 260 going from state H to E. A binary one output from sign detector 275 indicates that the black run in N memory 234 precedes the associated black run in H memory 235. Similarly a binary 0 on line 275*a* indicates that the black run in H memory 235 precedes that of the black run in N memory 234. In this manner detector 275 and counter 295 are effective to generate a signed algebraic number which provides a quantative measure of the relative position of the starting points of associated black runs in adjacent scan lines. This algebraic number is hereinafter referred to as the DELTA-I component of the encoded function pair in the DELTA format.

A second component of the function pair, DELTA-II, is generated by counter 296 and provides a quantitative measure of the difference in the duration of an associated pair of black runs on adjacent scan lines. Control 270 is effective to enable counter 296 in response to detector 260 changing from the H state to either A or E state. Counter 296 is subsequently disabled upon the transfer from either the A or E state to any of the states B, C or D. In this manner a first portion of the DELTA-II is generated by counter 296 corresponding to the leading non-overlapped portion of the associated black run pair. In the case where detector 260 passes from the state H to A, a signal indicating a positive sign is generated in sign detector 275 which is associated with the stored value, indicating that the black run in N memory 234 preceded that in H memory 235. Similarly in the case where detector 260 went from state H to E, a negative sign, associated with the stored value in counter 296, is generated by sign detector 275. In a third case, where both memories change from white to black simultaneously, corresponding to a transition in detector from state H to state C, the first portion of the DELTA-II component is zero and counter 296 remains at count zero. The entire DELTA-II component is provided by counter 296 from this first portion in response to signals from control 270 by subtracting the count produced while detector 260 is in state B, for the cases where the black run in H memory 235 extends beyond the black run in N memory 234, or adding the count produced while transition detector is in state D, for the cases where the black run in N memory extends beyond the black run in H memory 235. In a third case where the H and N memories simultaneously go from black to white, the second component is equal to zero. The net count on line 296*a* with the associated sign bit on line 275*b* is determined in accordance with the above signed algebraic numbers and comprises the DELTA-II component of the encoded segment of a scan line. The DELTA-I and DELTA-II code words are applied via lines 295 *a* and 296*a* together with associated sign data on lines 275*a* and *b* to function decoder 320 following the termination of a memory access period.

The look ahead access period utilized by logic 250 is terminated in response to any one of the following five conditions: (1) the N memory changing from black to white to black again while the H memory remains black (NEW START), (2) the N memory goes from black to white following coincident white to black transitions for both the N and H memories, (3) the H memory goes from black to white following coincident of transitions for the N and H memories, (4) a black to white transition of the H memory following non-coincident white to black transitions in the N and H memories, and (5) the completion of the second successive zero pair. The occurrence of the first condition above is effective to direct counter control 270 via line 251 to perform the encoding operation during the next memory access period in the ARL mode. The occurrence of the second through the fifth of the above conditions is effective to direct counter control 270 via line 251 to perform the next encoding operation in the CORREL mode. As discussed above, for the hereindescribed embodiment, the encoding mode follows a twenty line cycle, the first line being ARL while the next nineteen lines being CORREL. In this embodiment, during every twentieth line which is to be encoded ARL, look ahead logic 250 is responsive to a control signal from mode control 360 via line 290 to apply an appropriate signal via line 251 to direct counter control 270 to operate in the ARL mode, regardless of the occurrence of the above mentioned conditions two through five. Look ahead logic 250 is inoperative except during the look ahead access period as described above.

Upon a detection of the return of detector 260 to the home state H, memory access logic 220 is effective to generate a signal via line 226 which first disables transition detector 260 (which in turn remains disabled until the commencement of the next memory access period as initiated by the control signal on line 229). The signal on line 226 further enables readout logic 240 to initiate the readout portion of a memory access operation whereby the encoded scan line data is transferred to function decoder 320.

In operation, readout logic 240 (FIG. 9) receives a data request signal via line 361 from mode control 360, as described hereinbelow. The data request signal may be accompanied by a control signal on line 290 indicating that the current line is to be encoded in the ARL mode. In response to this applied signal on line 361, data request control 243 is effective to transmit, via line 243b and access request logic 244, a signal on line 241 to memory access logic 220. This signal on line 241 is gated in logic 220 with the function pointer 230 output signal (on line 231) so that, following the resetting of pointer 230, a control signal is applied via line 229 to transition detector 260 to initiate a memory access period. During the memory access period, the stored scan line data in memories 234 and 235 is processed, as described above, with the resultant encoded data being stored in counters 295 and 296, sign detector 275. In addition, appropriate zero pair, MERGE and grid condition signals are applied to lines 221, 222, and 223, respectively. The termination of the memory access period following a return to state H by detector 260 is referenced by the signal applied to readout logic on line 226. In response thereto, ZERO PAIR generator 245, MERGE generator 246, and GRID generator 247, all in readout logic 240, are activated.

Control 243 also provides output signals on lines 243a, c, and d. The signals on line 243*a* are applied to ZERO PAIR generator 245, MERGE generator 246 GRID generator 247, and counter readout controller 248. These signals are effective to direct generators to transfer the appropriately applied signals from inputs 221–223, from counters 295 and 296 and detector 275 to function decoder 320. Control 243 also provides parallel output lines 243*c* and *d* which are applied to function decoder 320 to respectively indicate the start of a line of encoded data, and a change in the encoding mode from CORREL to ARL. Generators 245–248 are enabled by the control signal from memory access 220 on line 226 which indicates the termination of the memory access period. Generators 245–247, connected with inputs on lines 221–223, respectively, indicate zero pair, merge or arid condition when enabled by the signal on line 226. The respective output lines 245*a*, 246*a* and 247*a* are applied to function decoder 320. Grid generator 245 further generates a signal via line 242 following the generation on line 245*a* of a grid signal to decoder 320. This signal on line 242 is used to decrease the stored count of grid signals in the grid counter in memory access logic 220, as described previously. In addition, a control signal on line 243a is effective to apply control signal via line 248 to function decoder 320 which is effective to activate gates in that decoder to pass the count output signals from counters 295 and 296 and sign detector 275.

A further pair of parallel outputs from logic 240 are applied to decoder 320 via lines 249*a* and *b*. Appropriate signals are provided on these lines by mode generator 249 in response to inputs from mode control 360 via line 290 and from counter control 270 via line 251. Respective signals on these lines indicate that encoding for the data being applied to decoder 320 is in the ARL mode. A signal on line 249*a* indicates that a single NEW START format counter word pair is applied to decoder 320, and a signal on line 249*b* indicates that the entire line is being enocded in the ARL mode.

In operation a data request signal is applied via line 361 to control 243. In response to the first such request signal in a scan line control 243 is effective to apply a signal on line 243*c* indicating the start of a scan line to function decoder 320. Function decoder 320 is thereupon effective to generate the appropriately encoded sequence of code words as described hereinbelow in conjunction with begin sequence generator 340 (which sequence in turn will be identified as such by receiver 30). Upon receipt of a second data request signal on line 361 from mode control 360, control 243 applies a control signal on line 243*a* to generators 245–247 and to controller 248.

In response to the control signals on line 243*a*, generators 245–247 and controller 248 apply control signals via their respective output lines to decoder 320 in the order of priority described below. In the case where an accompanying control signal on line 290 indicates that the encoding is performed in the ARL mode, then control 243 also transfers an appropriate control signal via line 243*d* to decoder 320. This latter signal is encoded by function decoder 320 whereupon it is subsequently transmitted to the remote receiving station 30. At that station, this signal is used to identify a change in the transmitted data from the CORREL to the ARL mode. In response to a signal on line 251, generator 249 applies via line 249*a* a signal which is used in decoder 320 to identify those portions of the counter data which represent data encoded in the ARL mode having the NEW START format. In the absence of an ARL indicating signal on line 290, function decoder 320 operates as described below to encode the applied data in the CORREL mode.

Following the transmission of the signal from generators 245–247 and controller 248, control 243 repetitively generates additional control signals on line 243*a*. Generators 245–247 then transmit in response their associated signals to function decoder 320. The count states of counters 295 and 296 are transmitted to decoder 320 by readout control signals from controller 248. Thus, at the start of a data readout operation, ZERO PAIR, MERGE and GRID generators 245–247 receive and store the corresponding indication signals that are applied via lines 221–223 from memory access logic 220. Data request generators 245–248 are interconnected in a manner so as to establish a priority schedule for reading out the stored indication signals in response to successive control signals on line 243*a* as follows: (1) ZERO PAIR, (2) counter 295, 296 and detector 275 data or MERGE condition and (3) GRID signals. The highest priority function present is transferred to decoder 320 in response to the memory access period termination signal on line 226. The next highest priority function which is present is transferred to decoder 320 in response to the first subsequent control signal applied from control 243 via line 243*a*. After all the stored data has been transferred to decoder 320 and following the next subsequent data request signal from logic 360 (line 361), control 243 transfers a control signal to access request logic 244 which is effective in turn to transfer a signal via line 241. This signal on line 241 is subsequently gated with the function pointer 230 output on line 231 to initiate the next subsequent memory access period (at the appropriate time when function pointer 230 next reaches count 1804).

The coincidence of a memory access period (indicated by the control signal on line 229) and a PZRO signal from zero pointer 172 of input section 110 (via line 165) enables line end detector 255 to generate control signals on lines 255*a* and 168. Line 255*a* is applied to mode control 360 and line 168 is applied to input section 110. The control signal on line 255*a* is used in mode control 360 to increment the line counter which in turn controls those lines which are encoded in the ARL mode, e.g., one line in 20. The signal on line 168 signal directs the transfer of a full line of new scan data in memory section 130 from T memory 133 to N memory 134 and N memory to H memory.

Line idle detector 256 provides a control signal first during the encoding of a line of scan data at such time when the encoding operation is complete but fewer then 300 bits of Sholtz encoded data have been generated by encoder 370 for the line (as described in conjunction with mode control 360), and also at such times when scan data for a next line is not immediately available in memory section 130 following the completion of a line encoding operation. An appropriate control signal is generated on line 256a to activate the idle sequence generator 330 in response to the control signal on line 368 (as described below in conjunction with mode control logic 360) so that data is available continuously to enable gap-free transmission to remote receiver 30. In response to the T to N and N to H memory transfer signal as applied via line 153 (described in conjunction with FIG. 5), detector 256 is inhibited, indicating that a new line of scan data is available for encoding.

Figure 10A:
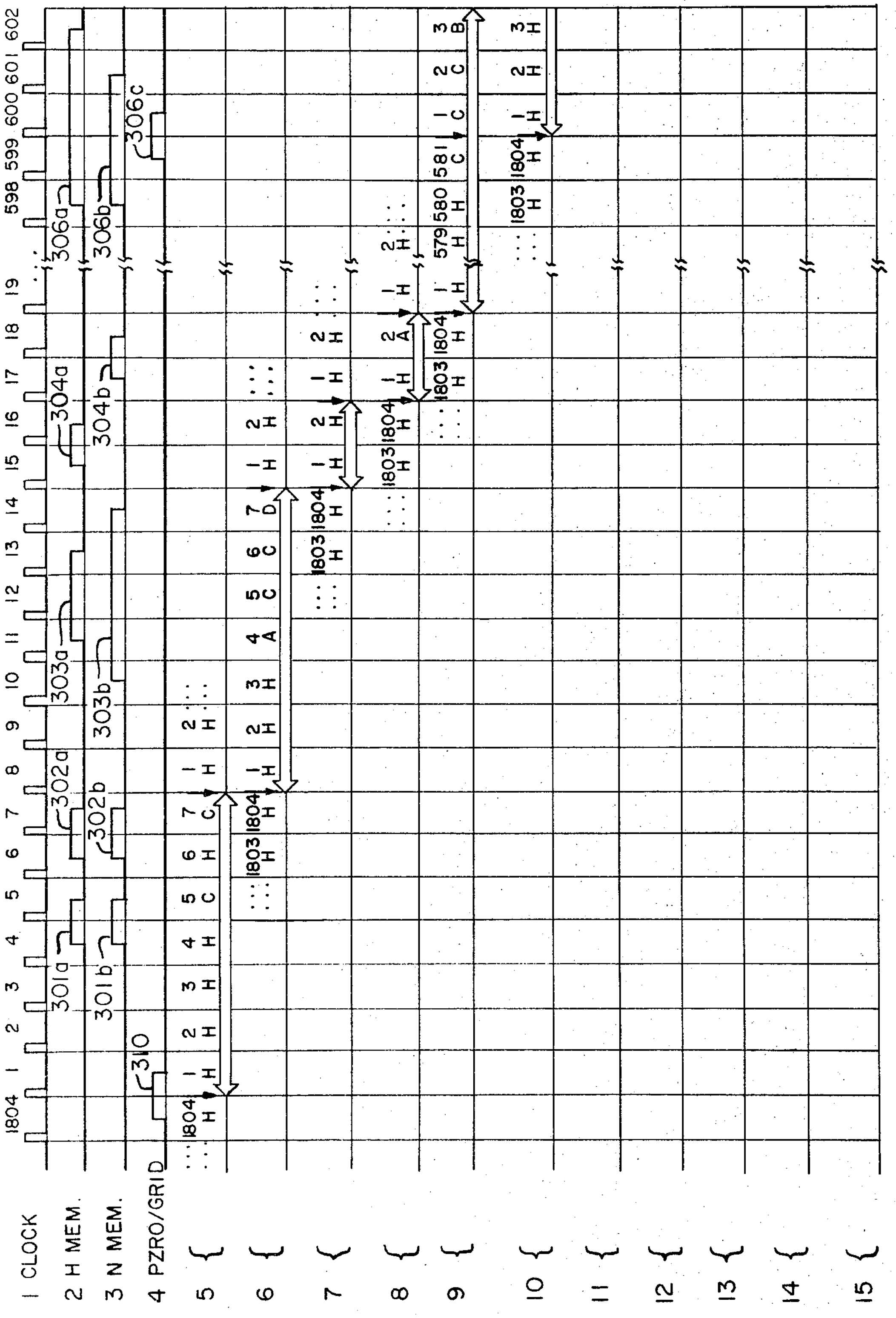
Figure 10B:
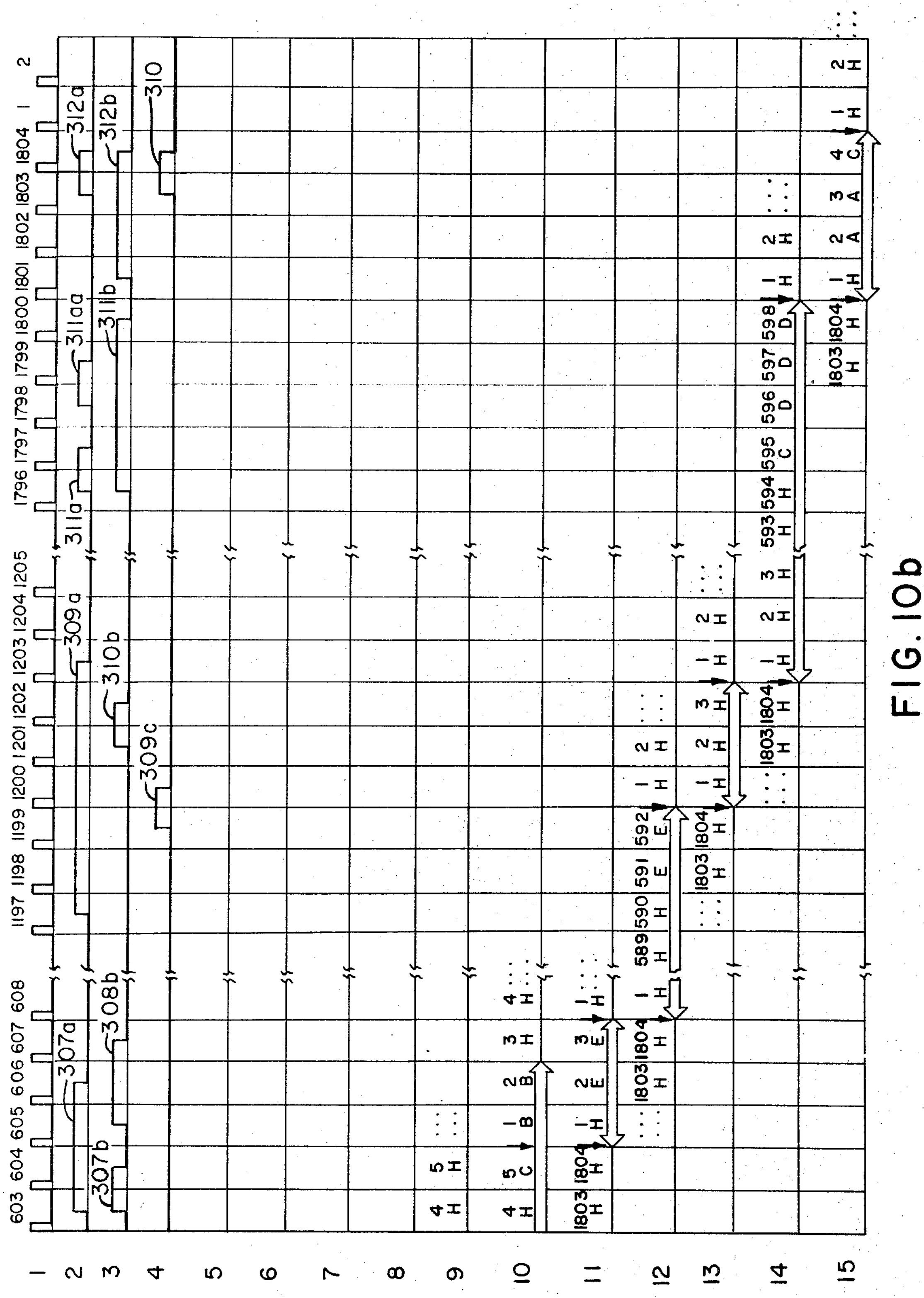

The above described embodiment of data sequence generator 210 may be more fully understood by considering the operation of generator 210 in the CORREL mode in the context of a specific example, and by referring to FIG. 10 in conjunction with FIG. 8. Line 1 in FIG. 10 shows the clock signal which may be applied to generator 210 via line 160. Also shown in association with line 1 in the appropriate intervals between clock pulses is the count state for zero pointer 172 of input control 120. Lines 2 and 3 show as a function of time an example of a portion of typical scan line data signals as such signals might respectively be applied on H and N memory output lines 204 and 202 as a function of time. It will be understood that the respective signals on lines 2 and 3 remain unchanged for the periods between clock pulses 19 and 598, 608 and 1197, and 1205 and 1796. Line 4 shows the PZRO and grid reference pulse signals 310, 306*c* and 309*c*, respectively, in their respective time relations to the zero pointer 172 count state shown in line 1, i.e., marking respectively, the first bit in a scan line and the 600th and 1200th bit in a stored line of scan data. In accordance with the present embodiment, the data signals as shown in lines 2, 3 and 4 are repetitively applied every 1804 bits during the recirculate mode of H and N memories 135 and 134 until the full line of N memory data is completely encoded. Line 5 through 15 show respectively the successive memory access periods (broad horizontal arrows) in their time relation to the count state of zero pointer 172. Each of lines 5 through 15 as shown in FIG. 10 is displaced in time from the previous line by some multiple of 1804 bits (corresponding to a full circulations in H and N memories 135 and 134). Also shown in association with lines 5 through 15 are the states of detector 260 as may be determined from FIG. 8, during the corresponding time periods of line 1 for the processing of the exemplary data signals of lines 2 and 3. Since the scan line data is assumed to be unchanged during the periods of time not shown, detector 260 is assumed to be in state H for all such times outside memory access periods. Associated with each of the state designations is the corresponding count state of function pointer 230. THe vertically oriented arrows associated with each memory access period shows the points within the respective H and N memory recirculate periods at which function pointer 230 is reset to the count 1 state; in the first instance, marking the point in a line at which the memory access is to being (corresponding to the time when function pointer 230 reaches count 1804), in the second instance, marking the point where the next subsequent memory access is to begin during the next recirculate period (in accordance with the above described operation).

In FIG. 10, lines 1 and 5 show that initially the count states of zero pointer 172 and function pointer 230 are identical at count 1804, indicating that the next clock pulse will both start a new line of scan data and also start a new line of scan data and also start a memory access as shown on line 5. The H and N memory data (lines 2 and 3) associated with the first four clock pulses in the new access period are binary 0, representing the four white cells which are used as a line start identifier in the hereindescribed embodiment. During zero pointer 172 count 5 and 6, the identical black runs 301*a* and 301*b* in respective H and N memories represent the first cell data for the corresponding scan lines of the subject copy. THe detection of these black runs is effective to change the state of detector 260 from state H to state C and back to state H. As described above, the detection of such an identical pair of black runs on the respective memories is designated as a "zero pair" condition. Following the detection of such a first zero pair condition during a memory access period, the transition by detector 260 back to the H state does not terminate the access period. Thus, it is not until the detection of a second zero pair, indicated by black runs 302*a* and 302*b* on the respective memory lines 2 and 3, whereby detector 260 returns to state H, that the memory access shown on line 5 terminates. At this time, zero pointer 172 is at count 8 and pointer 230 is reset to count 1 in order to mark the point in memories 234 and 235 at which the next bit is to be processed during the following memory access period. In addition, the appropriate code word indicating the zero pair conditions is transferred from memory access logic 220 to readout logic 240 and look ahead logic 250 is enabled in order that the H and N memory data might be used to make a determination as to the encoding mode (ARL or CORREL) during the next memory access period.

Figure 9:
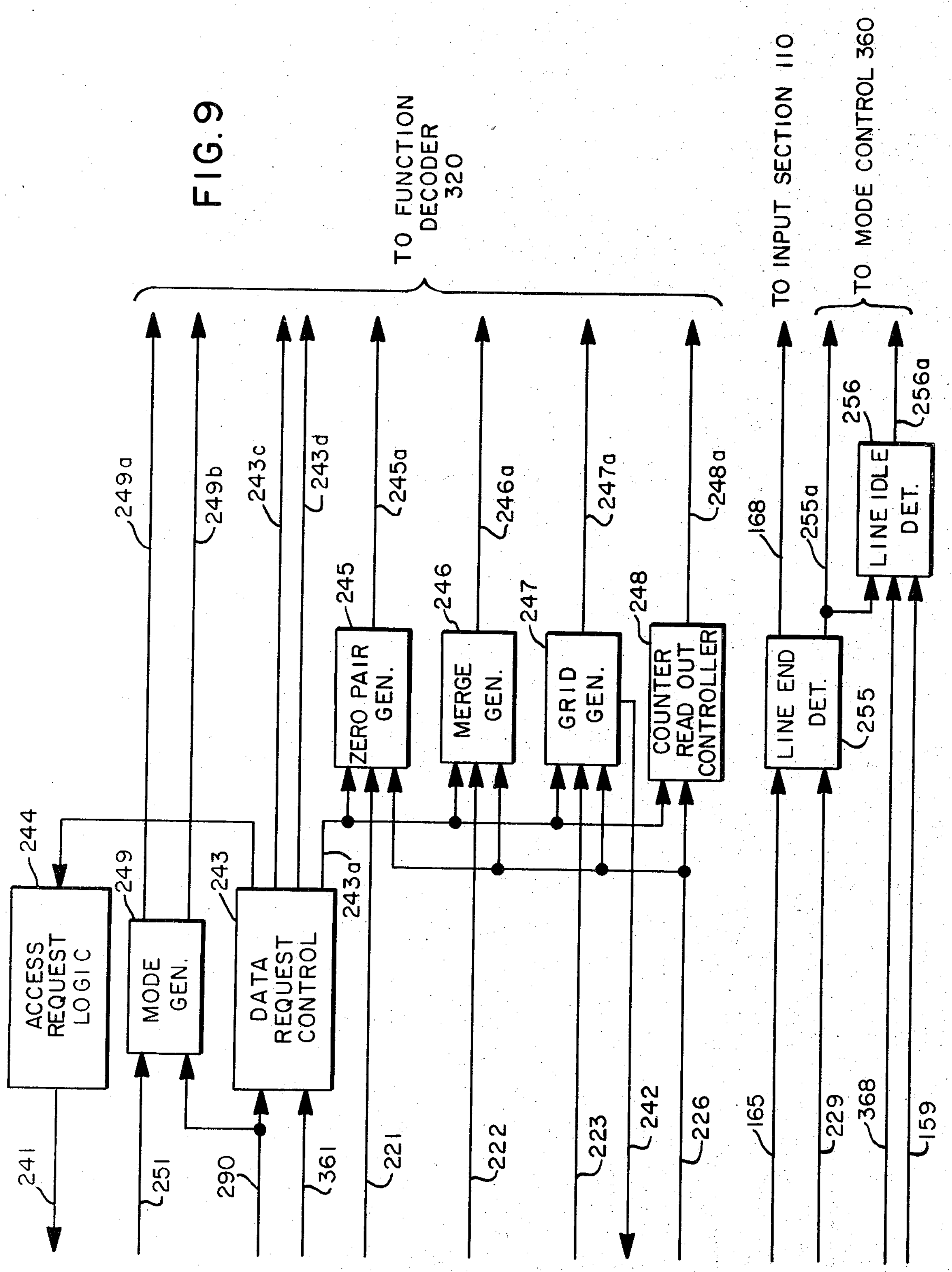
FIG. 9 illustrates in block diagram form the readout logic of the data sequence generator in FIG. 6, FIGS. 10A and 10B illustrate the sequential operation of the system in FIG. 1 for an exemplary facsimile transmission.

During the next circulation of the H and N memory data, as shown on lines 6 of FIG. 9, function pointer 230 reaches count 1804 during the zero during the zero pointer 172 count 7. Coincident with the next clock pulse, the memory access period beings with the resetting of the function pointer 230 to count 1 as zero pointer 172 is incremented to count 8. During this access period, the successive bits in H and N memories are applied to memory access logic 220. During the count 11 of zero pointer 172, it will be understood that detector 260 has transferred from the H to the A state, reflecting the start of black run of 303*b* (line 3). During zero pointer count 12, detector 260 is in the C state, reflecting the simultaneous occurrence of black runs 303*a* and 303*b*. The black to white (1 to 0) transition of the H memory data at the end of black run 303*a* is recorded during count 14 as detector 260 changes to state D. Following the transition of the N memory data from black to white, detector 260 returns to the H state for count 15, thereby terminating the memory access during this circulation of data in the H and N memories. The function pointer is reset to count 1, thereby marking the point at which the next memory access is to begin and the appropriate DELTA-I and DELTA-II code words as produced by white and black counters 295 and 296 and sign detector 275 are transferred to function decoder 320 under control of readout logic 240.

Similarly, lines 7 through 15 show for the remaining data signals the memory access periods, state changes of detector 260 and function pointer 230 count state. The black run 304*a* may be seen to occur without an accompanying change in the end memory data and thus is encoded by the MERGE code word during line 7. The black run 305*b* on N memory (line 3) may be seen to occur without any accompanying change in H memory (line 2) and is thereby encoded in the ARL mode, in response to a determination by look ahead logic 250 that a NEW START appears during the memory access shown on line 8. During the memory access shown on line 9, the associated black runs 306*a* and *b* are encoded in the DELTA format. During this access period, the grid signal 306*c* is effective to reset function pointer 230 prior to termination of the memory access period shown on line 9. In response to function pointer 230 count 1804, the memory access on line 10 commences following the 600 count of zero pointer 172. In this manner, the grid reference signal is appropriately sent to readout logic 240. As can be seen from line 10, the black runs 306*a* and 306*b* which remain during the memory access shown on line 10 do not effect the state of detector 260. The first such black runs that are processed by memory access logic 220 in this access are runs 307*a* and *b*. These associated black runs are encoded in the DELTA format. The function pointer 230 is reset to count 1 following the transition of black run 307*b* to the white state during the 604 count state of zero pointer 172 prior to termination of the memory access period. As function pointer again reaches count 1 the memory access period on line 11 may be seen to commence following the 604 count of zero pointer. The black run 308*b* (which overlaps the previously encoded black run 307*a*) is effectively encoded as a NEW START in the ARL format as detector 260 goes from state H to E and back to H. The memory access shown in line 12 is terminated by the grid signal 309*c* with the result that the back run 309*a* is encoded as a MERGE as detector 260 again goes from state H to E and to H. The next memory access (line 13) treats 310b as a NEW START which is encoded in the ARL mode. The memory access period on line 14 will be understood to treat black runs 311*a* and black run 311*b* in the DELTA format. Note that black run 311a does not cause detector 260 to change state and therefore is ignored. The memory access on line 15 processes the black runs 312*a* and *b* in the DELTA format. At the termination of this access, it may be seen that the count state of function pointer 230 is again aligned with the count state of zero pointer 172 at 1804, thereby indicating the completion of the encoding of a full line of scan data.

FUNCTION DECODER

Function decoder 320 (FIG. 1) performs combinatorial logic operations which are effective to transform the data signals into sequences of control signals on 21 output lines 320 *a–u*. These data signals include encoded scan signals originating from data sequence generator 210, idle sequence signals from idle sequence generator 330, begin sequence signals from the begin sequence generator 340 and end sequence signals from end sequence generator 350. Lines 320*a–u* correspond to 21 code words, V1–V21, of two general types: a first control information type, to be used in decoding the received signal in receive station 30, and a second data type, to be used in the appropriate encoding mode to correspond to the various output count states of counters 295 and 296 and sign detector 275. Code words V1–V21 are shown in Table I wherein words V1–V4 are of the control type, respectively denoting a new line start, change in encoding mode to ARL, grid signal and MERGE condition. In the CORREL mode, code word V2 is transmitted as a function pair prefix for all ARL or NEW START segments of an encoded scan line. Code word V2 is otherwise generated only as an ARL identifier to denote the encoded lines which are entirely in the ARL mode, e.g. the one line in twenty in the hereindescribed embodiment. In this latter situation, a prefix comprising V2, V2 is transmitted following the V1 line start prefix. Words V5–V21 are of the data type and are shown in Table 1 to have distinct set of meanings dependant on the current encoding mode of the transmitted data. It will be understood that the ones of the V- code words are assigned the various meanings in a manner so that the word length of the associated Scholtz code word is inversely related to the predicted frequency of occurrence of the condition based on the expected form of the subject copy.

In the Correl mode, a zero pair would be indicated to decoder 320 via an appropriate signal on line 245*a.* In response thereto function decoder 320 is effective to send a control signal via line 320*f*, corresponding to code word V6, followed by a second signal on that line. In this manner, a two-word signal would be applied to Scholtz encoder 370 having the CORREL mode DELTA-I and DELTA-II components "minus zero, minus zero" in accordance with Table 1 column A. Similarly in the ARL mode, a white-black run combination of two and three bits, respectively, will the encoded by a succession of control signals on lines 320 *g* and *h*, corresponding to code words V7 and V8, in accordance with Table 1, column B. It will be understood that in an embodiment for transmitting facsimile signals having black and white runs in excess of 16 cells, the function pair words may comprise more than two Scholtz code words, the excess cells being indicated by the use of the extend words as shown in Table 1. In such embodiments, any number of cells may occur in a given run, since it is only required to send an appropriate number of extend words coupled with a remainder word to accomplish the transmission of the appropriate number of cells. Thus, the number of V-code words for a particular function pair may range from two (e.g. in the ARL mode case where both the black and white runs are less than 16 cells in length) to 112 (e.g. in the ARL mode case where a line comprises a single white run and a single black run, each being 900 cells in length).

TABLE 1A

| Function Decoder Vocabulary Word | Scholtz Encoder Word | | | | | | | | |
|---|---|---|---|---|---|---|---|---|---|
| V1 | | 1 | 0 | 0 | 0 | 0 | 0 | 1 | 0 |
| V2 | | | | | 1 | 0 | 0 | 1 | 0 |
| V3 | | | 1 | 1 | 0 | 1 | 0 | 1 | 0 |
| V4 | 1 | 0 | 0 | 0 | 0 | 0 | 0 | 0 | 0 |
| V5 | 1 | 0 | 0 | 0 | 0 | 0 | 0 | 1 | 0 |
| V6 | | | | | | | | | 1 |
| V7 | | | | | | | 1 | 0 | 0 |
| V8 | | | | | | | 1 | 1 | 0 |
| V9 | | | | | 1 | 1 | 0 | 1 | 0 |
| V10 | | | | | | 1 | 0 | 0 | 0 |
| V11 | | | | 1 | 0 | 0 | 0 | 1 | 0 |
| V12 | | | | | 1 | 0 | 0 | 0 | 0 |
| V13 | | | 1 | 0 | 0 | 1 | 0 | 1 | 0 |
| V14 | | | 1 | 0 | 0 | 0 | 0 | 1 | 0 |
| V15 | | 1 | 0 | 0 | 0 | 1 | 0 | 1 | 0 |
| V16 | | | 1 | 0 | 0 | 0 | 0 | 0 | 0 |
| V17 | 1 | 0 | 0 | 0 | 0 | 1 | 0 | 1 | 0 |
| V18 | | 1 | 0 | 0 | 0 | 0 | 0 | 0 | 0 |
| V19 | 1 | 0 | 0 | 1 | 0 | 1 | 0 | 1 | 0 |
| V20 | 1 | 1 | 0 | 1 | 0 | 1 | 0 | 1 | 0 |
| V21 | | | | 1 | 0 | 0 | 0 | 0 | 0 |

TABLE 1B

| Function Decoder Vocabulary Word | Word Type | Word Meaning Or Value | | | |
|---|---|---|---|---|---|
| V1 | Control | BEGIN — Start New Line | | | |
| V2 | Control | CARL — Change to Absolute Run Length | | | |
| V3 | Control | GRID — Synchronize to Grid Line | | | |
| V4 | Control | MERGE — Erase Next Black Run | | | |
| | | A. CORREL | B. ARL MODE (Except new start black extend) | C. ARL MODE (New start black extend) | D. FACSIMILE CATEGORY DATA |
| V5 | Data | +0 | 8 | — | 0 |
| V6 | Data | −0 | Extend 16 | — | 1 |
| V7 | Data | +1 | 2 | — | 2 |
| V8 | Data | −1 | 3 | — | 3 |
| V9 | Data | +2 | 4 | — | 4 |
| V10 | Data | −2 | 5 | — | 5 |
| V11 | Data | +3 | 6 | — | 6 |
| V12 | Data | −3 | 7 | — | 7 |
| V13 | Data | +4 | 0 | — | 8 |
| V14 | Data | −4 | 9 | — | 9 |
| V15 | Data | +5 | 10 | — | Spare |
| V16 | Data | −5 | 11 | — | Spare |
| V17 | Data | +6 | 12 | — | Spare |
| V18 | Data | −6 | 13 | — | Spare |
| V19 | Data | +7 | 14 | — | Map End |
| V20 | Data | −7 | 15 | — | Spare |
| V21 | Data | Extend 8 | 1 | Extend 16 | Spare |

As seen in Table 1, there are four sets of meanings for the various V-code words V5–V21. The facsimile category set (column D.) is used in the begin sequence produced by generator 340 wherein the various categories of facsimile images in a system (FIG. 1) may be indicated by the appropriate V-code word in response to signal applied on lines 340*b* and *c*, as described in conjunction with sequence generator 340.

Decoder 320 may be implemented with any suitable form of combinatorial logic devices known in the art. In operation, the appropriate set of V-code word meanings are determined by decoder 320 and in response to the received signal on lines 249*a* and *b*, 243*c*, and 243*d*. Decoder 320 performs further combinatorial logic operations on the signals applied by these lines to generate control signals which are effective to select the appropriate code word depending on the mode of operation. The various inputs from counters 295 and 296 end sign detector 275 as applied by the appropriate lines to decoder are suitably combined by these logic operations into the respective ones of the 21 word V-code vocabulary.

SCHOLTZ ENCODER

Scholtz encoder 370 (FIG. 1) is effective to convert via combinatorial logic an applied signal on a respective one of the lines 320*a–u* (from function decoder 320) to a corresponding one of 21 variable length Scholtz code words, which are in turn applied in parallel to the output synchronizer 380. The Scholtz code words each correspond to a respective one of the code words V1–V21 (described above in conjunction with function decoder 320). The respective Scholtz code words are shown in Table 1 and may be seen to vary in length from one to nine bits. It will be understood that the ones of the Scholtz code words are assigned the various meanings in a manner so that the word length is inversely related to predicted frequency of occurrence of the condition based on the expected form of the subject copy. In this manner, an additional measure of bandwidth compression is achieved.

In the listing of Table 1, it will be understood that the first bit of each word is the rightmost bit, with the succeeding bits following from right to left and all words ending with a binary 1. The word series is so constructed that all words remain distinguishable in an uninterrupted series of words as described below in conjunction with decoder 420 in receiver station 30. The one to nine bit Scholtz encoded words are transferred in parallel on lines 370*a–h* to output synchronizer 380 in response to a control signal from mode control logic 360 via line 365. Corresponding to the Scholtz code words having fewer than nine bits, binary 1's are transferred as dummy bits on those ones of lines 370*a–h* having no Scholtz code bit.

OUTPUT SYNCHRONIZER

Output synchronizer 380 is effective to provide encoded scan data in the form of a continuous serial output on line 381 which is applied to data transmitter 390. Synchronizer 380 processes the parallel bit input of successive Scholtz code words (which have from one to nine bits) and converts these parallel words into a serial form having a uniform output bit rate. In operation, the nine line parallel output from encoder 370 is loaded into a buffer register in synchronizer 380. For the Scholtz code words having fewer than nine bits, binary 0's are loaded as dummy bits into the appropriate shift register stages so that a full nine bit word is stored. The shift register is connected in a recirculating configuration so that the encoded data stored in the register stages is continually recirculated through the successive register stages in response to applied clock pulses. Gating circuits are then effective to selectively apply the valid Scholtz code bits (excluding the dummy bits) from the recirculating memory to transmitter 390 via line 381 in a continuous stream at a uniform rate.

TRANSMITTER

The continuous serial output channel encoded data from output synchronizer 380 is applied via line 381 to data transmitter 390. Transmitter 390 may be one of many suitable forms known in the art which is effective to modulate and transmit the encoded data signal communication channel 20. By way of example, the encoded data may be single-sideband, amplitude-modulated (SSB-AM) and the resultant signal transmitted over a standard voiceband telephone line.

MODE CONTROL LOGIC

Mode control logic 360 provides a control over the operation of transmit section 10. Each line of encoded data is provided with an encoded prefix as produced by data sequence generator 210 in response to control signals applied from control logic 360. This encoded prefix denotes the scan line starting points in the continuous stream of Scholtz encoded data words produced by encoder 370. By way of example, the line start prefix comprises the single Scholtz code word VI (see Table 1).

In the hereindescribed embodiment, logic 360 also includes a modulo 20 counter section which increments in response to successive line end control signals applied via line 255*a* at the completion of the encoding operation for a line of scan data. The count output indicates the number of scan lines encoded in the CORREL mode since a previous ARL encoded line. At each time the modulo 20 counter reaches a count 1 state, a control signal is generated and applied to line 290 which is effective in turn to direct that a current line of scan data be encoded in the ARL mode. Thereby, every 20th line is encoded in the ARL mode. In response thereto, decoder 320 directs encoder 370 to produce the appropriate code word an ARL mode line of scan data, for example, by generating the sequence V2, V2, following the line start prefix.

Control 360 also applies the appropriate signals on lines 362–364 to generate control signals from the corresponding ones of idle, begin and end sequence generators 330, 340, and 350, respectively, as described below.

A further function of logic 360 is to ensure that a continuous supply of encoded data is available to function decoder 320 in order that a request for new data for transmission by output synchronizer 380 may be immediately fulfilled to achieve the resultant gap-free transmission over communication channel 20. Logic 360 initiates the generation of fill-in data by idle sequence generator 330 during those periods when no encoded scan line data is available for transmission in function decoder 320. In operation, output synchronizer 380 may apply a control signal via line 382 to logic 360 to effectively request that a new Scholtz encoded data word be applied for transmission. In response thereto, logic 360 applies a control signal via line 361 to data sequence generator 210 in a first case where scanner section 100 has provided input section with sufficient scan line data and such data is available for processing in memories 134 and 135. Thereafter, generator 210 commences a succession of memory access operations as described hereinabove to encode the current scan line data so that a new encoded word may be applied via decoder 320 and encoder 370 to synchronizer 380. In a second case where scanner section 100 is operative but input section 110 has not yet acquired sufficient data to allow encoding of an entire line, data sequence generator 210 is effective via line **265*a* to activate idle sequence generator 330, which in turn applies an appropriate sequence of signals to decoder 320 to maintain activity over communication channel 20. In a third case, where scanner section 100 is inoperative, logic 360 applies a control signal via line 364 to enable idle sequence generator 330 to similarly maintain activity over channel 20. In all three cases, when scan data becomes available for encoding, control signals on line 364 disable generator 330. An exemplary sequence of code words produced by generator 330** in the latter two cases is described below in conjunction with the detailed description of that generator.

To start the transmission of data representative of a subject copy, logic 360 enables begin sequence generator 340, which generates the begin sequence as described more fully below in conjunction with generator 340. Following the completion of the begin sequence, either data sequence generator 210 or idle sequence generator 330 is activated as described above in response to word request signals from synchronizer 380, as applied via line 38a. As decoder 320 generates the appropriate signal on the one of 21 lines **320*a–u* in response to an applied signal generator 210 or 330 respectively, Scholtz encoder 370 is enabled by a control signal on line 365 from logic 360 to apply the Scholtz encoded data to output synchronizer 380 for subsequent transmission over channel 20. At the conclusion of the transmission of data representing a subject copy, logic 360 enables end sequence generator 350 via line 363, which in turn directs that the appropriate code words be transmitted via transmitter 390 over channel 20. An exemplary end sequence signal is described below in conjunction with the detailed description of generator 350.**

In the hereindescribed embodiment, each scan line of data is required to comprise at least 300 output Scholtz encoded bits as applied to signal line 381. Control logic 360 insures that this requirement is met for each scan line by a minimum message length counter which is reset at the start of each line. This counter increments in response to pulse signals applied by signal line 383 which are also used in synchronizer 380 to accomplish the serial readout of the shift register parallel to serial conversion. Thereby, a count is maintained of the number of encoded bits applied to transmitter 390.

When the minimum message counter reaches a count of 300 for a scan line, a control signal is applied via control line 368 to data sequence generator 210.

In a case where the encoding of a scan line results in more than 300 Scholtz encoded bits as indicated by the minimum message counter is reset by the line end signal on control line 255a and logic 360 is effective to direct the encoding of the next line.

Following the completion of the encoding of a line in which case fewer than 300 Scholtz code bits are generated, and thus where sequence generator 210 senses the end of a line of scan data prior to receiving the control signal on control line 368, generator 210 is effective to enable idle sequence generator 330 via a control signal on line **256*a*, and thereby direct the generation to complete the 300 bit minimum requirement. Subsequently, when the minimum message counter reaches count 300, generator 330 is disabled by generator 210** and the encoding operation for the next scan line begins.

SEQUENCE GENERATORS

The begin sequence generator 340 (FIG. 1) is effective in response to a control signal from mode control logic 160 and a clock signal (line 160) to apply a sequence of control signals to function decoder 320 via output lines **340*a–d*. In response thereto, decoder 320 generates (in a manner described more fully hereinabove together with Scholtz encoder 370**) an encoded signal which indicates the start of a transmission of a subject copy facsimile signal.

In the hereindescribed embodiment, generator 340 responds to a signal from control logic 360 on line 362 to produce a seven bit sequence, having four pulses in succession on line **340*a*, followed successively by single pulses on lines 340*b*, *c*, and *d*. Lines 340*a–d* are applied to the appropriate inputs of decoder 320 as described below. Logic 360 initiates the operation of sequence generator 340 at the beginning of the transmission for a subject copy, i.e., before applying the data request signal via line 361 to data sequence generator 210. In this manner, the data to be transmitted to receive station 30 is provided with reference markers denoting the start of the transmission of an encoded subject copy facsimile signal. Thus such a begin sequence may be produced by Scholtz encoder 370 in response to the control signals applied by generator 340 via decoder 320. By way of example, the Scholtz encoded form of the begin sequence may include the following sequence of Scholtz words: V1, V1, V1, V1, N1, N2, V9.** In this sequece N1 and N2 represent the tens and units digit of the catgeory (see column D. of Table 1).

End sequence generator 350 operates similarly in response to a control signal from logic 360 applied via line 363 and clock signal from line 160. Generator 350 produces a six pulse sequence, having a first succession of three pulses on line 350*a*, followed by two pulses on line 350*b*, which are appropriately applied to the input of function decoder 320. In this manner a suitable input is applied to decoder 320 so that an encoded sequence may be transmitted to receive station 30, which in turn may be decoded to provide a signal identifying the completion of the transmission of a subject copy facsimile data. By way of example, the end sequence produces the following sequence of Scholtz code words: V1, V1, V1, V1, V19, V19 (see Table I).

Idle sequence generator 330 similarly produces a series of input signals on lines 330*a–h* to function decoder 320 which are subsequently encoded and transmitted to receive station 30. Generator 330 operates in response to a clock signal on line 160 and from either a control signal from logic 360 via line 364 or a control signal from sequence generator 210 via line 256*a*. Generator 330 is controlled to provide an idle sequence signal in response to three system conditions: (1) during transmission of subject copy facsimile data at such time when the number of Scholtz encoded scan data bits for a complete line does not exceed 300 bits, (2) in response to a signal on line 210*a* during transmission of facsimile data at such time when scan data is not immediately available in memories 134 and 135, and (3) in response to a control signal from logic 360 via line 364, following the completion of the transmission of the scan data for a subject copy (and the ensuing end sequence as described above). In this manner, gap-free data transmission having activity is maintained on communication channel 20. In other embodiments of this invention, different transmission means may impose other channel activity requirements. By way of example, the idle sequence generator 330 produces the following sequence of Scholtz code words V9, V17, V11, V13, V19, V14, V15, V20, and repetitions thereof, (see Table I). The sequence is repetitively generated for the duration of the idle period.

RECEIVE STATION

Receive station 30 is effective to receive the data signal transmitted over channel 20 by transmit station 10, demodulate and decode that signal and produce a hardcopy facsimile of the subject copy. The demodulated data signal is processed on a line-by-line basis to reconstruct digital representations of the scan line signals from the representative code signals. The signals received by station 30 for each scan line may be, for example, in the form of a three level, single side band, amplitude modulated signal. This signal is demodulated by data receiver 410 to produce a continuous stream of Scholtz code words. As described above, the Scholtz encoded data includes variable length words having no interword separation. This Scholtz encoded data is first converted by decoder 420 to a series of successive scan line data signals. Each scan line which is thereby produced is then further decoded in decoder 420. The source encoded data which is in either the ARL or CORREL format, is thereby reduced into a binary representation of the full cell scan line data for those segments of the scan lines encoded in the ARL mode, or provides the appropriate control signals to effectuate a modification of the previous stored scan line signal for those segments encoded in the CORREL mode. Following the completion of the decoding operation for a full scan line of data, the resultant signals are applied to printer 430 for the production of a permanent record of the facsimile image, for example, by a printer device having a stylus for electrostatically transferring the facsimile to the copy paper.

DATA RECEIVER

Data receiver 410 is effective to receive the data signals transferred by transmit station 10 over communication channel 20. Receiver 410 is further effective to demodulate the received data to provide a continuous stream of Scholtz encoded words. The demodulation process may be performed by any system known in the art which is compatible with transmitter 390 in transmit station 10. For example, transmitter 390 and receiver 410 may respectively modulate and demodulate the data signal in the form of a three-level, single side band, amplitude modulated signal which may be transmitted over a standard voiceband telephone line. In addition, receiver 410 may compensate for variations in amplitude and phase occurring in input signal as a result of fluctuations in transmission line. Further, channel delay distortion of the single signals may be compensated by an equalizer of a form well-known in the art. The output of the receiver 410 is an uninterrupted flow of Scholtz encoded words.

DECODER

Decoder 420 completes the facsimile data reconstruction portion of the receive station 30 operation by separating the continuous stream of Scholtz code words as received from receiver 410 into the appropriate constituent lines of scan data for the transmitted facsimile image. The received data is then processed on a line-by-line basis wherein the various Scholtz code words within each line are first identified, then translated into V-code words, and finally divided into the appropriate function pairs of associated words, where each function pair relates to a white and black segment of scan line data for the current line being constructed. The function pairs are then decoded in accordance with the appropriate mode, either ARL or CORREL, to form (in the ARL mode) the appropriate binary full cell scan line data, or to form (in the CORREL mode) the appropriate control signals to produce a new scan line data signal from the next previously constructed scan line data signal.

AS an intermediate step in the processing following the translation from Scholtz encoded data to the V-code words, the transmit station 10 V-code word assignments as displayed in Table 1 are transformed in input section 421 to the receive station 30 assignments shown in Table 2. It will be understood that V-code word assignments in Table 1 are based on a determination of the expected frequency of occurrence of the various encoded words and a matching of those probabilities in an inverse relationship with the length of the associated Scholtz words (as described in conjunction with Scholtz encoder 370 in transmit station 10). For example, in the described embodiment, an extension of 16 bits in the ARL mode, is expected to occur with the highest frequency and therefore that condition is indicated by the shortest Scholtz code word, comprising a binary 1. and corresponding to V6, as shown in Table 1. In this manner, optimum efficiency bandwidth compression is achieved in the transmission of the facsimile data over the communication channel 20. Having been received in station 30 in the above described format, the data words are transformed in decoder input section 421 for subsequent processing in accordance with Table 2 so that the V-words with increasing subscripts correspond to monotonically increasing numerical values. It will be understood that the transformation into this format provides an increased efficiency in the data processing within receive station 30 in the described embodiment.

TABLE 2

| A. V-Code Word | B. Correlation Mode | C. ARL Mode (New Start And ARL Line) | D. Idle Mode Facsimile Category Date) |
|---|---|---|---|
| V5 | +0 | 0 | 0 |
| V6 | −0 | 1 | 1 |
| V7 | +1 | 2 | 2 |
| V8 | −1 | 3 | 3 |
| V9 | +2 | 4 | 4 |
| V10 | −2 | 5 | 5 |
| V11 | +3 | 6 | 6 |
| V12 | −3 | 7 | 7 |
| V13 | +4 | 8 | 8 |
| V14 | −4 | 9 | 9 |
| V15 | +5 | 10 | Spare |
| V16 | −5 | 11 | Spare |
| V17 | +6 | 12 | Spare |
| V18 | −6 | 13 | Spare |
| V19 | +7 | 14 | Map End |
| V20 | −7 | 15 | Spare |
| V21 | Extend 8 | Extend 16 | Spare |

Figure 11:
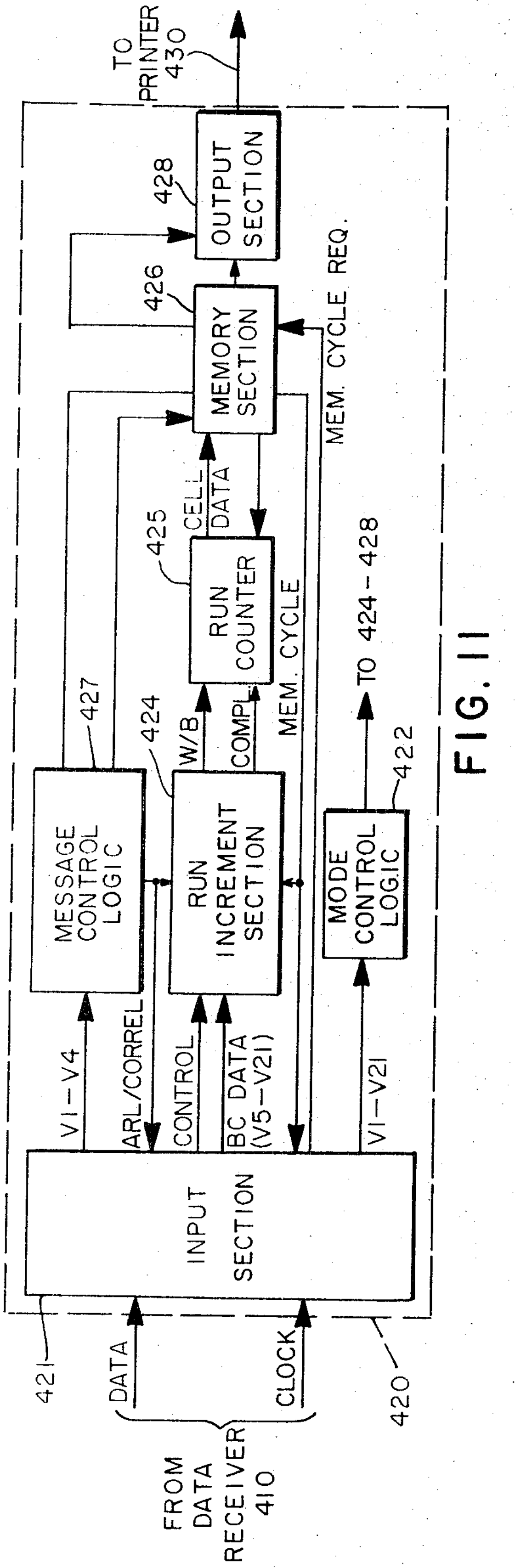
FIG. 11 illustrates in block diagram form the decoder of the receiver station in FIG. 1.
Figure 12:
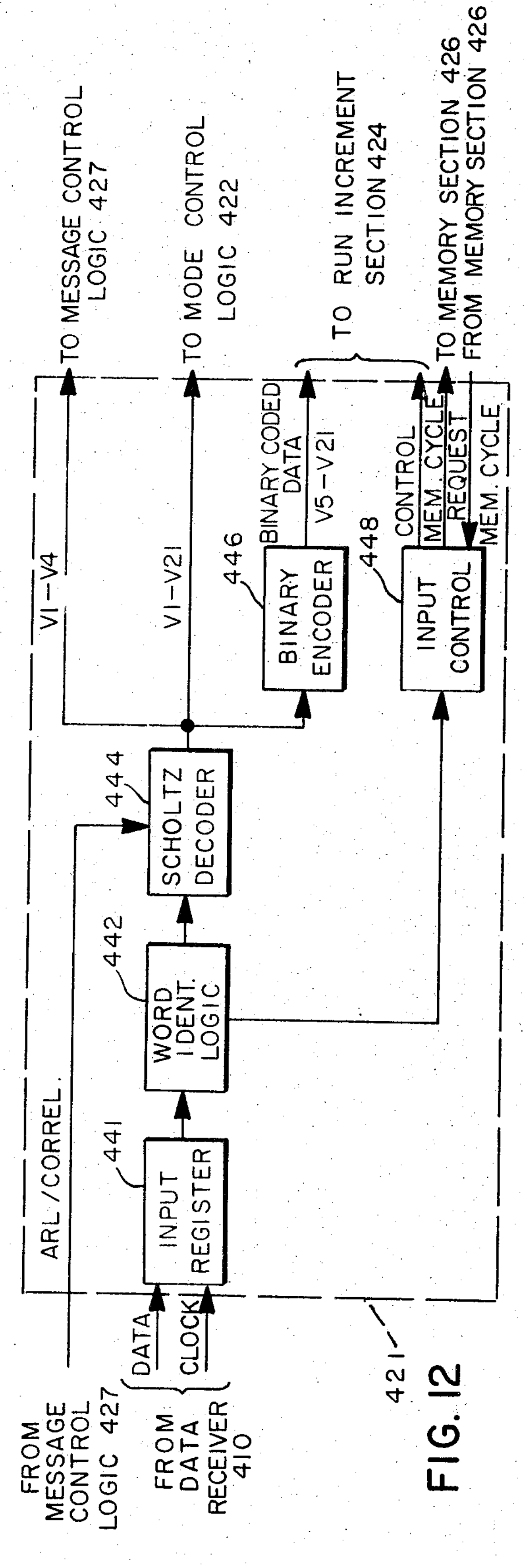
FIG. 12 illustrates in block diagram form the input section of the decoder in FIG. 11.

In FIG. 11, decoder 420 is shown to include input section 421, mode control 422, run increment section 424, run counter section 425, memory section 426, message control logic 427 and output section 428. Input section 421 is shown in detailed form in FIG. 12. In that figure, the input data signal comprising a continuous stream of Scholtz words is applied to decoder input section 421 where the Scholtz word separation points in the continuous data stream are identified in the following manner. The applied Scholtz encoded data are serially loaded into a nine bit shift register 441 in which all stages have been preset to the binary 0 state. The stored data in the first through the third stages are monitored in word identification logic 442 to detect a condition wherein either a binary 1 in the first and second stages or a binary 1 in the first stage together with a binary 0 in the third stage. The presence of either condition indicates that a full Scholtz code word is present in the nine stage input shift register, whereupon that word is transferred as described below and all stages of the register are reset to the zero state prior to detection of the next complete word.

The detected individual Scholtz words are then successively transferred and applied to a combinatorial logic Scholtz decoder network 444 in section 421 which is effective for each applied word to generate an output control signal on an appropriate one of 21 output lines, wherein each line represents a V-codd word, V1–V21, corresponding to a one of the Scholtz words. A signal on one of the first four lines, representing words V1–V4, denotes control information as shown previously. A signal on a one of the remaining seventeen lines, representing words V5–V21, may denote numerical information for the facsimile image being transmitted in accordance with Table 2. The V-code words on the 21 respective lines are then successively applied under the control of input control 448 to mode control 422 which is effective to determine the operational mode of decoder 420.

To accommodate the encoding modes of transmit station 10, decoder 420 operates as determined by mode control 422, in a one of four modes: IDLE, CORREL, ARL and NEW START. Control 422 directs decoder 420 operation to be in the first mode, IDLE, upon recognition that the received V-code word sequence is in accordance with tHe IDLE sequence, V9, V17, V11, V13, V19, V14, V15, V20, and repetitions thereof, as defined above in conjunction with idle sequence generator 330. During the IDLE mode, except for control 422 and input section 421, decoder 420 is inoperative and provides no data to printer 430.

Upon recognition that the received V-code word sequence is in accordance with the BEGIN sequence, V1, V1, V1, V1, N1, N2, V16 (where N1, N2 represent V-code words corresponding to facsimile category data words, shown in column D of Table 2), as defined above in conjunction with begin sequence generator 340. control 422 transfers decoder 4420 operation to the CORREL mode, thereby energizing the formerly inoperative portion of decoder 420, and preparing those portions to receive V-code data. As described above in conjunction with mode control logic 360 in transmit station 10, a first line of scan data in a facsimile transmission is preceded by a BEGIN prefix word, V1, followed by a double CARL prefix word, V2, V2. In response to the double CARL prefix, indicating an entire line of ARL encoded data, control 422 transfers the operative mode of decoder 420 to the ARL mode. The effect of operation in ARL mode is that decoder 420 processes the subsequently received V-code words as ARL-encoded function pairs, as described below, until completion of an entire scan line, indicated by the receipt of a new line start prefix, BEGIN, i.e., V1.

Upon receipt of this next line start prefix, control 422 directs the operation of decoder 420 to be in the CORREL mode. Operation of decoder 420 is generally maintained in the CORREL mode for the next subsequent nineteen lines of scan data (since the hereindescribed embodiment operates in the ARL mode for one line in twenty). An exception to this operational procedure accommodates the ARL-encoded function pairs for NEW START segments within a CORREL mode scan line. As described in conjunction with function decoder 320 in transmit station 10, such function pairs are preceded by a single CARL prefix word, V2. In response to the identification of a single CARL prefix word during the CORREL mode operation, control 422 is effective to transfer the operative mode of decoder 420 to the NEW START mode, wherein the subsequently received function pair is processed as ARL data, as described below. After processing that function pair, decoder 420 is returned to the CORREL mode.

Control 422 maintains the operation of decoder 420 in a one of the active data processing modes CORREL, ARL, or NEW START until either the IDLE sequence is received (indicating that an interruption in the supply of data from scanner 105 has occurred in transmit station 10) or there is received an END sequence of V-code words, V1, V1, V1, V1, V19, V19, as defined in conjunction with sequence generator 330 of transmit station 10. In either of the above cases, decoder 420 is returned to the IDLE mode until either scan data is again received, continuing the interrupted transmission, or a new facsimile transmission is started, as indicated by a BEGIN sequence.

In addition to transferring the V-code words to mode control 422, input section 421 is further effective to translate via binary encoder 446 a signal on a one of the 17 lines (corresponding to words V5–V21) to a five bit binary coded form, with the data words V5–V21 respectively corresponding to the binary coded words in the sequence 00000–10000 as shown in Table 3. A binary coded word so formed is then transferred to run increment section 424 whereupon that word is used to preset a five stage down-counter. It will be understood that those five bit binary coded words are equivalent to the decimal numbers 0 through 16. Thus with decoder 420 in the ARL mode and following the transfer of a binary coded word, the state of the down-counter in run increment section 424 is representative of the numerical value corresponding to the respective V-code word, as shown in column C of Table 2. It will be further understood that the four bit binary coded word, the state of the first four most significant bit stages of the down-counter in run increment section 424 is representative of the numerical value corresponding to the respective V-code word, as shown in column B of Table 2, when considered together with the least significant bit denoting a positive sign by binary 0 and a negative sign by binary 1. As a result of this transfer operation, the V-code word numerical values in either the ARL or CORREL are thereby successively stored as a preset count state of the down-counter in run increment section 424. These V-code value signals are subsequently used to generate control signals which update run counters 425 in the manner described below.

TABLE 3

| A. V-Code Word | B. MSB | C. 2nd MSB | D. 3rd MSB | E. 4th MSB | F. LSB |
|---|---|---|---|---|---|
| V5 | 0 | 0 | 0 | 0 | 0 |
| V6 | 0 | 0 | 0 | 0 | 1 |
| V7 | 0 | 0 | 0 | 1 | 0 |
| V8 | 0 | 0 | 0 | 1 | 1 |
| V9 | 0 | 0 | 1 | 0 | 0 |
| V10 | 0 | 0 | 1 | 0 | 1 |
| V11 | 0 | 0 | 1 | 1 | 0 |
| V12 | 0 | 0 | 1 | 1 | 1 |
| V13 | 0 | 1 | 0 | 0 | 0 |
| V14 | 0 | 1 | 0 | 0 | 1 |
| V15 | 0 | 1 | 0 | 1 | 0 |
| V16 | 0 | 1 | 0 | 1 | 1 |
| V17 | 0 | 1 | 1 | 0 | 0 |
| V18 | 0 | 1 | 1 | 0 | 1 |
| V19 | 0 | 1 | 1 | 1 | 0 |
| V20 | 0 | 1 | 1 | 1 | 1 |
| V21 | 1 | 0 | 0 | 0 | 0 |

The succession of numerical value signals stored in run increment section 424 represents a continuum of function pairs as transmitted from transmit station 10. As defined in conjunction with station 10, these function pairs correspond to a segment of scan line data comprising a run of white cells followed by a run of black cells. As further defined in conjunction with station 10, the function pairs include a first set of V-code words followed by a second set. Each of these sets include at least a one of words V-5 through V-20 and may further be followed by one or more V-21 words, in accordance with TABLE 2, so that each set fully describes the length of the associated run (ARL mode) or the change in the associated run (CORREL mode).

Figure 13:
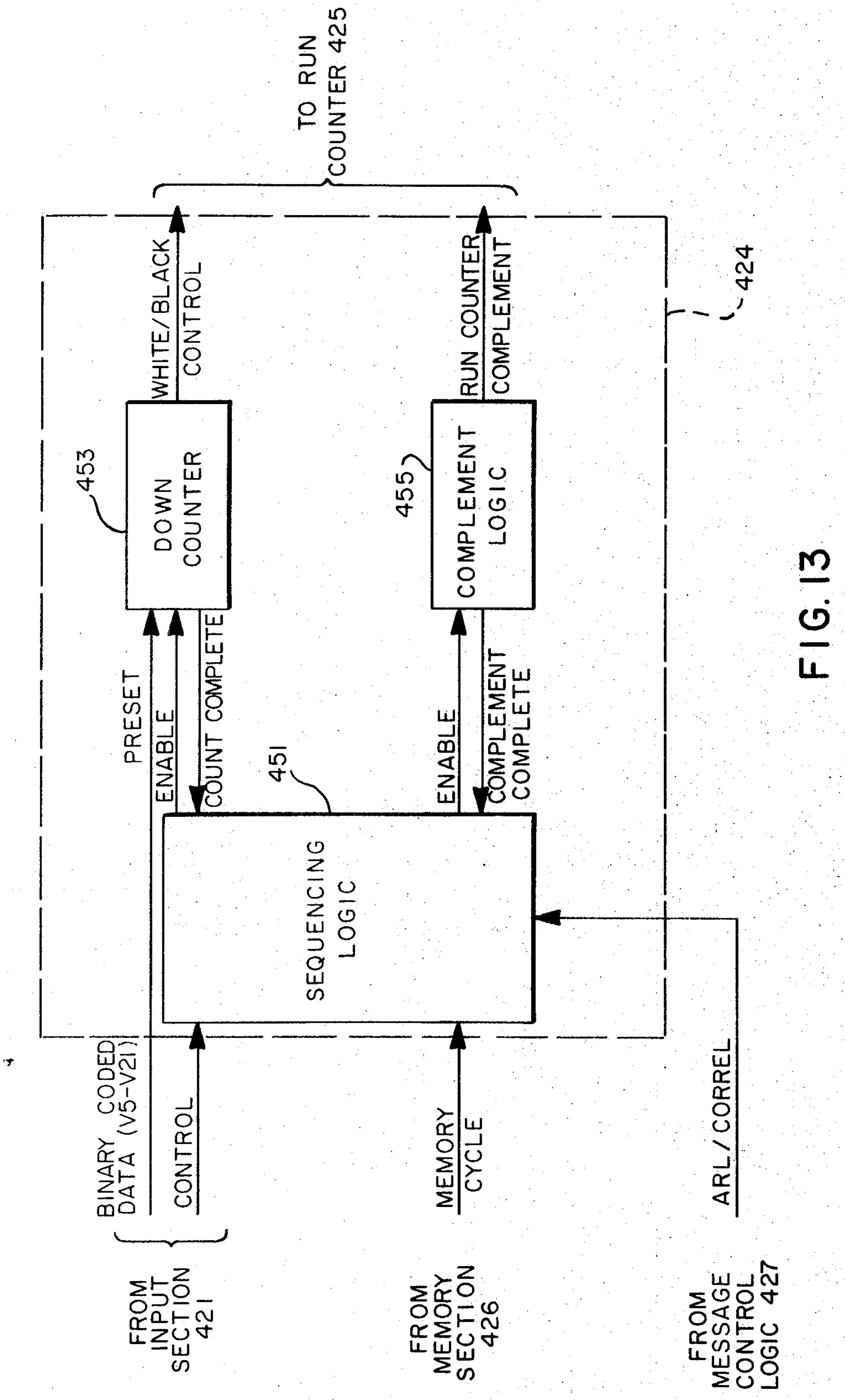
FIG. 13 illustrates in block diagram form the run increment section of the decoder in FIG. 11.

Run increment section 424 is shown in FIG. 13 to include sequencing logic 451, down-counter 453 and complement logic 455. Except at such times within a cycle of operation for memory section 426, as described hereinbelow, the down-counter in run increment section 424 is decremented or counted down from the preset V-code numerical value to the zero state at six bit per microsecond clock rate for each successively received V-code word from input section 421. A control signal is generated for the duration of each such count down operation in run increment section 424, which signal is applied to run counter 425. Run counter 425 includes two up-down counter portions, for white and black data respectively. The individual ones of the successively generated control signals from section 424 are routed by down counter 453 in run increment section 424 to an appropriate one of the white and black up-down counter portions of counter 425. The successive control signals are effective to alternately energize, in an incrementing or upcounting mode, first the white counter followed by the black counter in response to the detection of successive V-code words V5 through V20. The detection of V-code word V21 represents an extend word in a function pair and thus is not effective to switch the energization of either the white or black counter.

In response to being energized as described above, the energized one of the black and white counters of run counter 425 is incremented at a six bit per microsecond rate for the duration of the count down operation of the counter 453 in run increment section 424, thereby increasing the count state of the respective up-down counter in run counter 425 by a count equal to the numerical value of the received V-code word.

As described above, run increment section 424 is not operative to energize the white and black counters of run counter 425 during a cycle of operation of memory section 426. Further, as immediately following a memory cycle, the white and black counters in run counter 425 are set to a reference data count state corresponding to the white and black runs from the next segment of the previously reconstructed scan line. In response to a control signal from message control logic 427 to run increment section 424, which signal indicates that the currently processed function pair (as stored in the counter 453 of run increment section 424) is in the ARL mode, both the black and white counters in run counter 425 are reset to the zero state at the termination of the memory cycle, and then the run increment section 424 is effective in the above described manner to energize in succession the white and black counters of run counter 425. In this manner, those counters are effective to store the white and black function pair data in the form of a count state, representing the number of cells in the respective white and black runs of the associated segment.

Similarly, in response to a control signal from message control logic 427 to run increment section 424, which signal indicates the current function pair in section 424 is in the CORREL mode, sequencing logic section 451 is effective to detect from the least significant bit of the V-code numerical values stored in its counter whether that value corresponds to a positive (binary 0) or negative (binary 1) value. If in response to that detection the value is determined to be positive, then section 424 is effective to energize the white counter in run counter section 425. The net result of this operation is that the reference data count state stored in run counter 425, representing the previous white cell run is incremented to the extent represented by the positive V-code value (corresponding to the DELTA-I portion of the function pair as described in conjunction with data sequence generator 210 of transmit station 10), thereby up-dating that portion of the function pair. On the Other hand, should the detection of the least significant bit of the value stored in increment section 424 show a negative value, then complement logic 455 of run increment section 424 generates a control signal which is effective to complement the reference data stored in the white counter of run counter 425. The signal from counter 453 is then effective to energize that counter to increment the complemented value (at the six bit per microsecond rate) to the extent of the signals stored in run increment section 424. Complement logic 455 of section 424 is then effective to complement again the new value stored in the white counter of run counter 425. The net effect of this operation is to subtract the value stored in increment section 424 from that reference data from the previous scan line. This corresponds to a negative DELTA-I signal as generated in transmit section 10. The overall effect of whichever of the above two operations is performed is to indicate to printer 430 whether a black run in the currently reconstructed scan line either precedes (positive DELTA-I) or follows (negative DELTA-I) the corresponding black run of the previous line and also the extent of the offset.

Similarly, the next portion of the function pair (corresponding to the (DELTA-II component) received by run increment section 424 is effective to transfer the appropriate data signal to the black counter of run counter 425. The net effect of this operation is to indicate to printer 430 whether the length of the black run in the current scan line either exceeds (positive DELTA-II) or is less than (negative DELTA-II) the corresponding black run of the previous line and also the extent of the change in length.

Following the completion of the loading of a complete function pair into run counter 425 in the above described manner, an appropriate control signal is transferred to memory section 426, that signal being effective to request a cycle of memory operation. The memory cycle operation is effective to transform that newly constructed function pair to scan cell data which is then stored in memory section 426, as described below. Following the cycle of memory operation, as described below, the next received function pair is similarly processed.

The white and black pair data in the corresponding updown counter portions of run counter 425 is stored in the form of a count state representing the number of cells in the respective white and black run of the associated segment. Upon receipt of an appropriate control signal from memory section 426, thereby commencing a memory cycle, the stored function pair is transformed to scan cell data in the scan line data signal being reconstructed in memory section 426. A detailed description of that memory section now follows.

Figure 14:
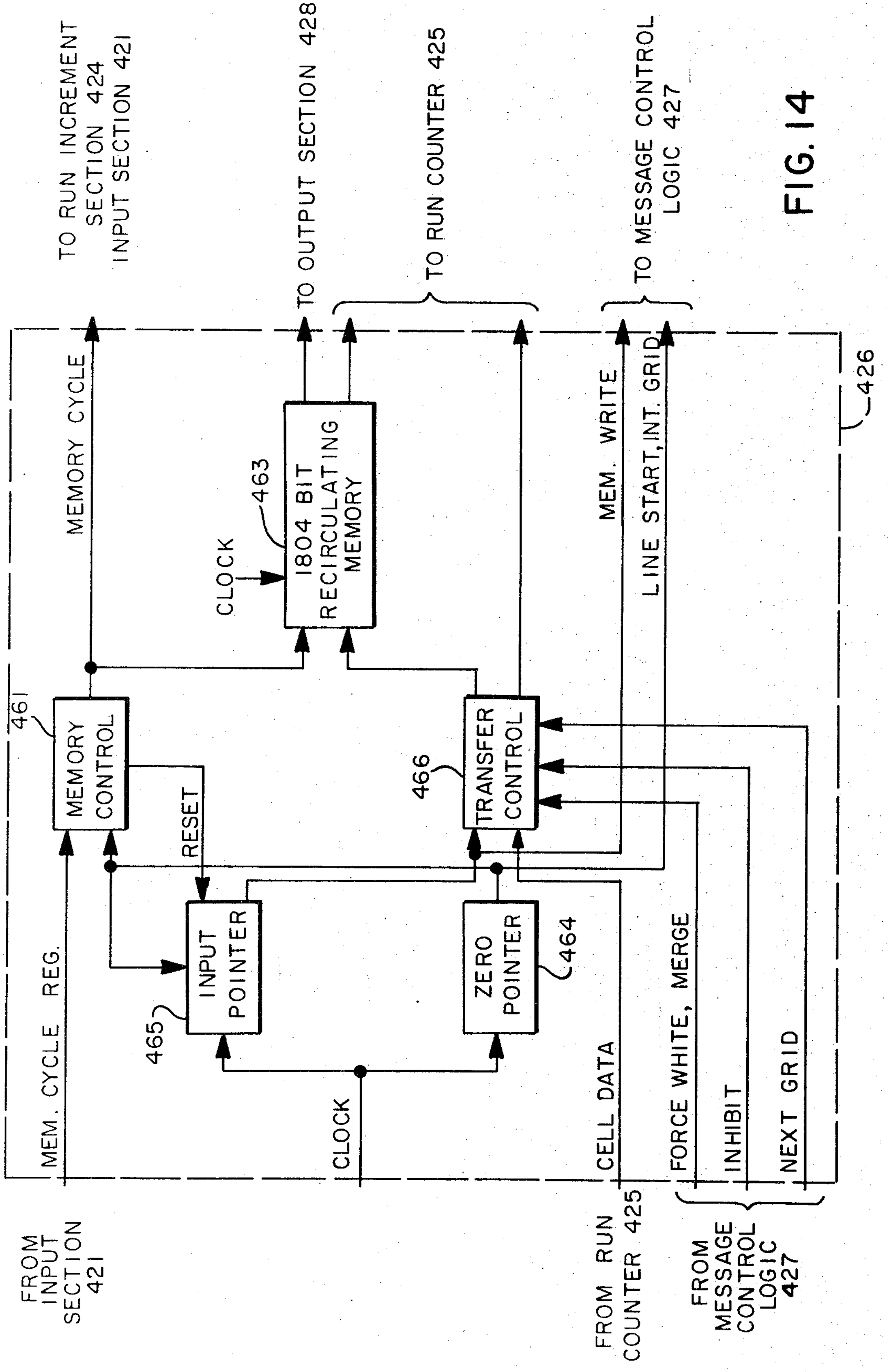
FIG. 14 illustrates in block diagram form the memory of the decoder in FIG. 11.

Memory section 426 (FIG. 14) comprises a memory control 461, a transfer control 466 and an 1804 bit recirculating memory 463 in which function pair data is assembled to form a reconstructed scan line dats signal. The 1804 bits in a full line scan signal stored in memory 463 include four prefix white bits (for insuring that each scan line starts with a run of white cells) followed by 1800 bits corresponding to the scan cell signals produced by scanner 105 in transmit station 10. In operation, the memory data is recirculated at the clock rate of six bits per microsecond.

The memory section 426 operates in a repeating sequence of steps. Initially, in the CORREL mode, the data stored in the recirculating memory 463 is used as reference data in the construction of a new scan line from the function pair data. (As described above, this reference data is not used in constructing portions of the scan line which are in the ARL mode, but is used in constructing portions in the CORREL mode.) The new scan line data assembly is accomplished in discrete portions, i.e., function pairs, consisting of a run of white cells followed by a run of black cells. Prior to the start of a memory cycle, a single function pair is stored as described above in the white and black, up-down counter portions of run counter 425. It will be understood that the function pair data in section 425 in CORREL mode segments includes the respective white and black run lengths as derived from the previous scan line which has been updated with DELTA format data from run increment section 424. In the ARL mode, the function pair data in section 425 includes just the respective white and black run lengths.

Memory section 426 also includes a zero pointer 464 which is substantially similar to zero pointer 172 in input section 110, in that the zero pointer 464 is an 1804 counter and performs a reference counting operation to identify and generate reference marker signals at the starting point and also the one-third (600th bit) and two-third (1200th bit) points in a line of scan data stored within the recirculating memory. In addition, a memory input pointer 465 is also used in memory section 426 to perform substantially the same function as function pointer 230 in data sequence generator 210 of transmit station 10. That is, the input pointer 465 is also an 1804 counter and is used to identify the point within the recirculating memory where the new data is to be inserted on successive cycles of the recirculation of the stored data. Following each storage operation in the recirculating memory, the input pointer 465 is reset to a count 1 state so that the next memory storage operation may commence 1804 bit periods from the just terminated operation or some multiple of 1804 bit periods therefrom. In this manner, the input pointer assures that the reconstructed data is stored in a contiguous manner.

During the first part of each memory cycle, under the control of memory control 461, the function pair data as stored in run counter 425 is transformed into the appropriate run of white and black cells in the proper location, as identified by the memory input pointer 465, in the recirculating memory. This transformation is accomplished by sending an appropriate control signal to run counter 425, which in response thereto is effective to first count down the white up-down counter from its count state (representing the white run length of the current segment) to the zero state. Corresponding to every count in the sequence, a white cell (binary 0) is entered via transfer control 466 in the corresponding location in the line of scan data in the recirculating memory 463. This new data replaces the previously stored data at those locations. When the white counter of run counter 425 reaches the zero state, run counter 425 directs that its black counter similarly counts down from its count state (representing the black run length of the current segment) to the zero state. Just as with the white cells, for every count increment of the black counter, a black cell (binary 1) is stored via transfer control 466 in the appropriate ones of the bit locations in the recirculating memory 463, replacing the previously stored data. In this manner, the function pair for the current segment is transformed from the count state form in run counter 425 to the full cell scan data as described in memory section 426. In certain cases described below in conjunction with message control logic 427, a "force white" control signal applied to transfer control 466 causes all white data to be stored in memory 463, regardless of the data in counter 425. Similarly an indirect signal from logic 427 is effective to prevent storage of the counter 425 data in memory 463. Following the storage operation performed by memory 463, the memory input pointer 465 is reset to count 1 state to mark the starting point in the recirculating memory for the next function pair storage operation.

During the second portion of each memory cycle, under control of memory control 461, the next scan line segment including a white and black run is transferred from the recirculating memory 463 to the respective white and black up-down counters in run counter 425 for use as reference data in the reconstruction of the segment. As each cell in the respective white and black run is successively applied via the memory output during the recirculation of the memory 463 data, the appropriate one of the black and white counter portions of run counter 425 is incremented in a count-up mode. When the output of the memory 463 data returns from black to white marking the end of the next segment, the memory cycle terminates. In this manner at the termination of a memory cycle, the white and black up-down counter portions of run counter 425 are preset to a count state respectively equal to the number of white and black cells in the runs of next segment. This data is used as reference data, as described above, in the construction of the next function pair data to be stored in run counter 425, i.e. in the CORREL mode, the change data represented by a DELTA-I and DELTA-II format words are used to up-date this reference data, and in the ARL mode the reference data is cleared and just the direct run lengths are entered in counter 425. It will be understood that in all operations above, the data in the memory 463 recirculates at the six bit per microsecond rate, and similarly the counter portions of run counter 425 increments at that rate.

In addition to the above described scan line data reconstruction operations, decoder 420 is effective to respond to the receipt of control V-code words V2, V3 and V4 in the manner now described.

Figure 15:
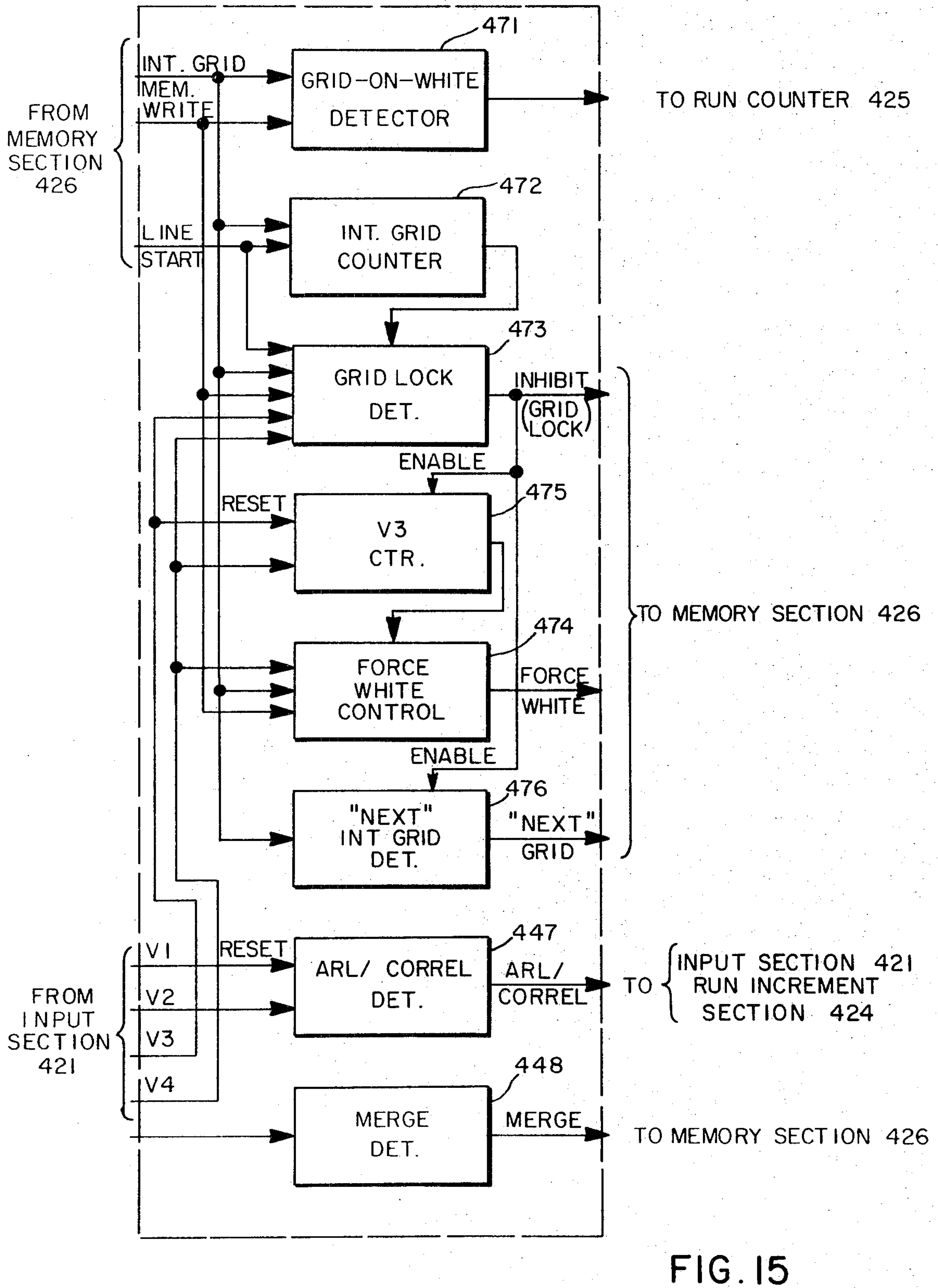
FIG. 15 illustrates in block diagram form the message control logic of the decoder in FIG. 11.

The received BEGIN, CARL, GRID AND MERGE conditions as transmitted by station 10 are processed in message control logic 427 of decoder 420 in response to the receipt of the respective one of V-code words V1-V4 from input section 421. Logic 427 comprises eight portions 471–478, as shown in FIG. 15, for producing appropriate memory storage and access control signals corresponding to the detected conditions. It will be understood that implementation of portions 471–478 may be readily accomplished by one skilled in the art using conventional logic elements, including AND, OR, NOT or NAND, NOR logic circuits.

Grid-on-white detector 71 detects the occurance of the internally generated grid marker (produced by the zero pointer 464 of memory section 426) during periods when the recirculating memory 473 is being loaded with white run data. When this condition is detected, the white run counter portion of run counter 425 is reset to a count state equal to one. The effect of this operation is to terminate any memory cycle which would otherwise overlap a receiver grid point (one-third or two-third) in a scan line. Ordinarily, such an overlap would not occur, as described in conjunction with data sequence generator 210 of transmit station 10. However, transmission and processing errors might occur to cause such an overlap. Thus, this first portion of logic 427 limits the propagation of errors in the facsimile image to a maximum length of one-third of a scan line.

A second portion of message control logic 427 internal grid counter 472 produces a count output equal to a number of internally generated grid markers (produced by the zero pointer in memory 426) which have occurred during the reconstruction of a line. This counter is reset to the start of each line. This counter 472 has an output of one following the receipt of the first internal grid marker, occurring with 600th cell of memory recirculation, and a count state of two indicating the reception of a second internal grid marker, occurring with the 1200th cell of the memory recirculation. These output signals are utilized in conjunction with several other portions of logic 427 as described below.

Lock detector 473 is effective to prevent further entry of data from run counter 425 into the recirculating memory 473 when either an internal grid marker (generated by the zero pointer), or the last cell in the memory is detected (indicated by a line start signal generated by the zero pointer) prior to the receipt of the corresponding signal from transmit station 10, i.e., either a GRID word, V3, or a BEGIN word, V1. This condition, referred to as "grid lock," continues to be effective until the receipt from input section 421 of either a GRID word, V3, or a BEGIN word, V1, (indicating the start of a new line). The net effect of this operation is to resynchronize (at a grid or linestart point) the reconstructed scan line data with the data transmitted from station 10 whenever the reconstructed data leads the transmitted data.

A fourth portion of logic 427, force white control 474, is effective to detect a condition which will force the storage of white cells into the memory 473, overriding the status of the counters in run counter 425. Such operation is performed following the receipt from the transmit station 10 of a GRID word, V3, in the case where an internal grid marker has not yet been detected. White cells are stored in the memory 473 until the next internal grid marker is received. The input pointer 455 is then reset to the count 1 state and the reconstructed data is thus resynchronized with the transmitted data.

A fifth portion of message control logic 427, V-3 counter 475, detects and stores GRID signals, V3, which have been received by input section 421 prior to the corresponding internal grid marker as generated during reconstruction of a line. A forced white memory storage operation always follows such a detected condition, as described above, and thereby forces the storage white cells in the memory until the next internal grid marker has been reached.

A sixth portion of logic 427, "next" internal grid detector 476, is effective to send a control signal to memory section 426 denoting that a GRID signal, V3, has been received from transmit station 10 following a grid lock condition and the next internal grid marker corresponding to the GRID signal is to be detected during the next memory recirculation. When that internal grid marker is reached, the input pointer is reset to the count 1 state and the reconstructed data and transmitted data are again synchronous. The grid lock condition is thereby terminated, with the normal scan line reconstruction continuing with the next function pair stored in run counter 425.

ARL detector 477, the seventh portion of the logic 427, detects the receipt by input section 421 of a CARL word V2. In response thereto logic 427 directs an appropriate control signal to input section 421 and run increment section 424, causing those sections to process the received function pair data in the ARL mode. At times other than those following the receipt of a V2 word, that control signal is effective to direct section 424 to operate in the CORREL mode. Upon detecting a double V2 word, section 424 is directed to process the function pairs received in the ARL mode until the next BEGIN word, V1, is received.

The eighth and last portion of message control logic 427, merge detector 478, detects MERGE word, V4, and controls the reference data transfer operation performed during a memory cycle following the detection of that MERGE word. This portion of logic 427 is effective to direct that all white bits be entered into the recirculating memory of memory section 426 for the duration of the memory cycle.

When an entire line of new scan line data has been constructed in the recirculating memory 463, as indicated by the zero pointer 464 denoting the start of a new line, the new line of scan data is transferred to the decoder output section 428. Section 428 includes a recirculating buffer which is effective to transfer in the data from the memory section 426 at the six bit per microsecond rate. The scan line data is then transferred out in full line increments to the printer 430 in response to a control signal from message control logic 427. The data transfer to printer 430 is accomplished at a substantially low rate compatible with the operation of printer 430, e.g. 30 kilobits per second.

PRINTER 430

Printer 430 receives the decoded facsimile data from decoder 420 and may record this information in hardcopy format by any means well known in the art. In the one embodiment, the facsimile data is printed horizontally on a line-by-line basis by three stylii which are mounted at equal distances on a rotating belt. Each stylus is used to print every third scan line. Each scan line is effectively divided into 1800 cells having dimensions 0.01×0.01 square inches. As each stylus translates across the surface of the copy paper, the printing of the facsimile image is started by the placement of an electrostatic charge on the appropriate ones of these cellular regions of the paper where a black cell is to be printed. Those cellular regions which are to remain white receive no charge. The paper is advanced onetenth of a line for every 180 cells traversed by a stylus. Thereby, following the electrostatic charging of a complete scan line (1800 cells), the copy paper is in position for the next stylus to begin processing the next scan line. After the data for the subject copy has been completely reduced to a series of electrostatically charged regions on the copy paper, thereby providing a latent image, the copy paper is advanced at a high speed into a toner and developer assembly, where toner is deposited evenly over the map. The toner adheres only to those areas of the map which were electrostatically charged by a stylus. The copy paper is then transferred to a heat drum whee that toner adhering to the charged regions is fused to the paper to form black regions with all non-charge regions remaining white. In this manner a permanent copy of the facsimile image is produced. In other embodiments of this invention, different printer means utilizing other techniques may be used.

Much of the above description has specified the logical function to be performed. The implementation of the function can be carried out with conventional logic arrangement, AND gates, OR gates or NAND, NOR logic.

The invention may be embodied in other specific forms without departing from the spirit or essential characteristics thereof. The present embodiments are therefore to be considered in all respects as illustrative and not restrictive, the scope of the invention being indicated by the appended claims rather than the meaning and range of equivalency of the claims are therefore intended to be embraced therein.

I claim:

1. Apparatus for producing a digital signal representation of an image having areas of two discrete optical densities, comprising:

means for scanning successively said image in accordance with a pattern of uniformly spaced lines of scan, means for sampling and detecting the optical density of contiguous spatial increments of said image along each of said lines of scan, means for generating two multiple bit binary half-cell signals for each of said lines of scan, the bits of the first of said half-cell signals being directly related to alternate ones of said spatial increments including the first of said increments in each of said lines of scan, and the bits of the second of said half-cell signals being directly related to alternate ones of said spatial increments including the second of said increments in each of said lines of scan, and each bit of said half-cell signals having a one of two amplitude levels, corresponding to the detected optical density of said related spatial increment, said first amplitude level corresponding to the first of said discrete optical densities and said second level corresponding to the second of said optical densities, storing successively for each of said lines of scan said two multiple bit binary half-cell signals, producing successively for each of said lines of scan, a multiple bit full cell line signal, storing successively at least two of said multiple bit full cell scan line signals corresponding to two adjacent lines of scan, wherein said full cell line signal is produced for each of said lines of scan with each bit of said full cell scan line signal related to the bits in said correspondingly positioned two binary half-cell signals, such that the bits of said full cell scan line signal has the same amplitude level as said corresponding bits in said half-cell signals when said corresponding bits have identical levels, and each bit of said full cell scan line signal has the same level as the corresponding bit in said previously stored full cell scan line signal from the preceding adjacent line of scan when the level of said corresponding bits in said half-cell signals differ.

2. An apparatus in accordance with claim 1, wherein said means for storing said half-cell signals includes:

a first storage means being operable in a one of two modes, a first mode for storing a plurality of said bits of said half-cell signals as generated at a first time rate, and a second mode for recirculating said stored bits in said first storage means at a second time rate substantially higher than said first rate.

a control means for selecting the one of said two modes of operation for said first storage means.

3. An apparatus in accordance with claim 2; wherein said means for producing said scan line signal further includes:

a second storage means for storing a complete multiple bit full cell binary scan line signal, said second storage means operable to recirculate said storage signal at said second rate, a control means for transferring said stored bits in said first storage means to said second storage means.

4. Method of producing a digital signal representation of an image having areas of two discrete optical densities, including the steps of:

scanning successively said image in accordance with a pattern of uniform spaced lines of scan, sampling and detecting the optical density of contiguous spatial increments of said image along each of said lines of scan, generating two multiple bit binary half-cell signals for each of said lines of scan, the bits of the first of said half-cell signals being directly related to alternate ones of said spatial increments including the first of said increments in each of said lines of scan, and the bits of the second of said half-cell signals being directly related to alternate ones of said spatial increments including the second of said increments in each of said lines of scan, and each bit of said half-cell signals having a one of two amplitude levels, corresponding to the detected optical density of said related spatial increment, said first amplitude level corresponding to the first of said discrete optical densities and said second level corresponding to the second of said densities, means for storing successively for each of said lines of scan said two multiple bit binary half-cell signals, means for producing successively for each of said lines of scan a multiple bit full cell scan line signal, means for storing successively at least two of said multiple bit full cell scan line signals corresponding to two successive lines of scan, wherein said means for producing said full cell scan line signal includes a means for relating the bits of said full cell scan line signal to the correspondingly positioned bits in said binary half-cell signals, wherein each bit of said full cell scan line signal has the same amplitude as said corresponding bits in said half-cell signals when said corresponding bits have identical levels, and wherein each bit of said full cell scan line signal has the same level as the corresponding bit in said stored next previous full cell scan line signal, when the level of said corresponding bits in said half-cell signals differ.

* * * * *